United States Patent
Awoniyi-Oteri et al.

(10) Patent No.: US 12,302,336 B2
(45) Date of Patent: May 13, 2025

(54) TECHNIQUES FOR MULTI-SLOT SEMI-PERSISTENT SCHEDULING (SPS) OCCASIONS

(71) Applicant: QUALCOMM Incorporated, San Diego, CA (US)

(72) Inventors: Olufunmilola Omolade Awoniyi-Oteri, San Diego, CA (US); Jelena Damnjanovic, Del Mar, CA (US); Tao Luo, San Diego, CA (US); Ozcan Ozturk, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 405 days.

(21) Appl. No.: 17/411,008

(22) Filed: Aug. 24, 2021

(65) Prior Publication Data

US 2023/0069103 A1   Mar. 2, 2023

(51) Int. Cl.
*H04W 72/23*   (2023.01)

(52) U.S. Cl.
CPC .................................. *H04W 72/23* (2023.01)

(58) Field of Classification Search
CPC .................................................... H04W 72/23
See application file for complete search history.

(56) References Cited

U.S. PATENT DOCUMENTS

| | | | | |
|---|---|---|---|---|
| 8,705,424 B2* | 4/2014 | Cai | | H04W 72/52 |
| 2005/0102412 A1* | 5/2005 | Hirsimaki | | H04L 43/0882 |
| 2005/0180363 A1* | 8/2005 | Yano | | H04L 1/0041 |
| 2015/0365191 A1* | 12/2015 | Lee | | H04J 14/08 |
| 2018/0331805 A1* | 11/2018 | Xia | | H04B 7/088 |
| 2020/0413424 A1 | 12/2020 | Fakoorian et al. | | |
| 2021/0153237 A1* | 5/2021 | Saber | | H04W 72/23 |

(Continued)

OTHER PUBLICATIONS

CATT: "Discussion on PUSCH Resource Collision and DL SPS Enhancement", 3GPP TSG RAN WG1 Meeting #98, R1-1908600, 3rd Generation Partnership Project (3GPP), Mobile Competence Centre, 650, Route Des Lucioles, F-06921 Sophia-Antipolis Cedex, France, vol. RAN WG1, No. Prague, CZ, Aug. 26, 2019-Aug. 30. 2019, Aug. 17, 2019, pp. 1-8, XP051765208.

(Continued)

*Primary Examiner* — Ronald B Abelson
(74) *Attorney, Agent, or Firm* — Guang Y. Zhang; Loza & Loza LLP

(57) ABSTRACT

A method for wireless communication between at a base station and a user equipment is provided that accommodates multiple data streams of varying traffic characteristics. The base station may configure semi-persistent scheduling (SPS) occasions having a particular periodicity. Each SPS occasion having multiple slots associated with multiple physical downlink shared channels (PDSCH). A message is transmitted to a user equipment (UE) indicating the SPS occasions. Subsequently, the base station transmits data to the UE over the multiple PDSCH during the indicated SPS occasions. The base station can dynamically adjust the number of PDSCH for an SPS occasion, wherein different number of PDSCH are used in two sequential SPS occasions. Also, the PDSCH in a same SPS occasion may use at least one of: different encoding schemes or different modulation schemes.

23 Claims, 19 Drawing Sheets

(56) References Cited

U.S. PATENT DOCUMENTS

| | | | | |
|---|---|---|---|---|
| 2021/0176654 A1* | 6/2021 | Pezeshki | ........... | H04W 72/0453 |
| 2021/0184812 A1* | 6/2021 | Jazi | ..................... | H04W 72/044 |
| 2021/0368453 A1* | 11/2021 | Lee | ..................... | H04W 52/146 |
| 2022/0022046 A1* | 1/2022 | Leyh | ..................... | H04W 72/52 |
| 2022/0137293 A1* | 5/2022 | Zhou | ..................... | G02B 6/124 |
| 2022/0174739 A1* | 6/2022 | Kwak | ............... | H04W 74/0816 |
| 2022/0191900 A1* | 6/2022 | Takeda | ............... | H04W 72/1268 |
| 2022/0377796 A1* | 11/2022 | Jung | ..................... | H04L 1/1864 |
| 2023/0198683 A1* | 6/2023 | Gao | ..................... | H04L 1/1861 |

OTHER PUBLICATIONS

International Search Report and Written Opinion—PCT/US2022/040762—ISA/EPO—Nov. 29, 2022.
Samsung: "Discussion on DL SPS", 3GPP TSG RAN WG1 #97, R1-1906961, 3rd Generation Partnership Project, Mobile Competence Centre, 650, Route Des Lucioles, F-06921 Sophia Antipolis Cedex, France, vol. RAN WG1, No. Reno, USA, May 13, 2019-May 17, 2019, pp. 1-5, May 3, 2019, XP051708996, p. 1-p. 5, Figures 1a-1b.

* cited by examiner

TECHNIQUES FOR MULTI-SLOT SEMI-PERSISTENT SCHEDULING (SPS) OCCASIONS

TECHNICAL FIELD

The technology discussed below relates generally to wireless communication and, more particularly, to scheduling of semi-persistent occasions for communications using multiple physical downlink shared channels (PDSCH).

INTRODUCTION

Next-generation wireless communication systems (e.g., 5GS) may include a 5G core network and a 5G radio access network (RAN), such as a New Radio (NR)-RAN. The NR-RAN supports communication via one or more cells. For example, a wireless communication device such as a user equipment (UE) may access a cell via a network node or entity, which may be implemented by a base station or gNodeB (gNB), for example.

Various new applications that may be implemented on UEs, like virtual reality (VR), augmented reality (AR), and tactile feedback, have different traffic characteristics or patterns than voice or other multimedia communications. Therefore, a way is needed to efficiently and flexibly schedule data transmissions of varying traffic characteristics.

BRIEF SUMMARY OF SOME EXAMPLES

The following presents a summary of one or more aspects of the present disclosure, in order to provide a basic understanding of such aspects. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

A first feature provides a base station and method thereon for wireless communication using multi-slot SPS occasions. The base station may define or configure semi-persistent scheduling (SPS) occasions having a periodicity. Each SPS occasion having multiple slots associated with multiple physical downlink shared channels (PDSCH). The base station may then transmit a message to a user equipment (UE) indicating the SPS occasions. Subsequently, the base station may transmit data to the UE over the multiple PDSCH during the indicated SPS occasions. Each PDSCH in an SPS occasion may carry a variable number of data bits.

In one aspect, the number of PDSCH for an SPS occasion may be dynamically adjusted, wherein different number of PDSCH are used in two sequential SPS occasions. For instance, the number of PDSCH is increased or decreased based on at least one of: (a) traffic received at the UE, or (b) an amount of data the base station intends to send.

Another aspect provides for a maximum number of PDSCH allowed for the SPS occasions may be sent to the UE using a radio resource control (RRC) signaling, medium access control (MAC) signaling, or Layer1 signaling.

According to another aspect, a first SPS occasion includes a first PDSCH and a second PDSCH, where the first PDSCH and second PDSCH use at least one of: different encoding schemes or different modulation schemes. This may permit different types of traffic within PDSCHs of the same occasion to be modulated and/or encoded differently (e.g., to optimize deliver).

In various implementations, the UE may send acknowledgments to the base station to indicate which PDSCH or slots were received or not received. For instance, the base station may receive: (a) an individual acknowledgment from the UE for PDSCH in an SPS occasion, (b) a block acknowledgment from the UE for all PDSCH in an SPS occasion, or (c) a joint acknowledgment from the UE for all PDSCH in multiple SPS occasions.

Upon receipt of such acknowledgments, the base station may choose to retransmit some PDSCH or slots. One or more of the SPS occasions may be configured by the base station to include PDSCH retransmission information within a physical downlink control channel (PDCCH), the PDSCH retransmission information specifying one or more PDSCHs within one or more SPS occasions which were previously transmitted. For instance, the base station may transmit a physical downlink control channel (PDCCH) separate from the SPS occasions, the PDCCH providing PDSCH retransmission information to the UE and specifying one or more SPS occasions in which previously transmitted PDSCH are to be retransmitted. Subsequently, the base station may transmit the specified or identified PDSCH.

In one example, acknowledgments from the UE may be referenced by one or more identifiers (e.g., HARQ ID) that map to one or more previously transmitted slots. In one example, each of the one or more identifiers is a function of at least the periodicity and a maximum number of PDSCH in an SPS occasion. These one or more identifiers may be computed using Equation 2, above. At the base station, the one or more identifiers are mapped or converted to slots (or PDSCH) to ascertain which PDSCH (or slot) should be retransmitted.

According to one example, the base station may transmit data to the UE over the multiple PDSCH during the indicated SPS occasions using: (a) a different downlink beam to transmit each PDSCH within an SPS occasion, (b) a different downlink beam to transmit the PDSCH in different SPS occasions, or (c) one downlink beam to transmit all PDSCH within in all SPS occasions. Similarly, acknowledgments from the UE to the base station may be sent using the same uplink beam for all ACKs associated with all SPS occasions, or a different uplink beams for ACKs associated with different SPS occasions.

In order to reduce power consumption at the UE, the base station may send an indication to the UE specifying when one or more PDSCH within an SPS occasion are empty or will not be transmitted. This allows the UE to turn off, power down, or enter a power savings mode (e.g., shut off one or more components, radio chain, etc.) when one or more PDSCH are expected to be empty or not transmitted.

These various aspects may be implemented by a base station and UE that communicate using a 5G network.

A second feature provides a user equipment (UE) and method thereon for wireless communications using multi-slot SPS occasions. The UE may receive, from a base station, scheduling information for semi-persistent scheduling (SPS) occasions having a periodicity. Each SPS occasion having multiple slots associated with multiple physical downlink shared channels (PDSCH). The UE may adapt its transceiver to receive according to the scheduling information. Subsequently, the UE may receive data over the multiple PDSCH during the indicated SPS occasions.

The UE may transmit an acknowledgment to the base station for PDSCH in the SPS occasion(s). In various examples, (a) an individual acknowledgment may be transmitted to the base station for PDSCH in an SPS occasion, (b) a block acknowledgment may be transmitted to the base station for all PDSCH in an SPS occasion; or (c) a joint acknowledgment may be transmitted to the base station for all PDSCH in multiple SPS occasions.

According to one aspect, the UE may receive additional information from the base station that adjusts the number of PDSCH for an SPS occasion, wherein different number of PDSCH are used in two sequential SPS occasions.

In another example, the UE may send acknowledgments, in response to received data over the multiple PDSCH, indicating which PDSCH were correctly or incorrectly received. The acknowledgments may include one or more identifiers that map to one or more previously transmitted slots, and each of the one or more identifiers is a function of at least the periodicity and a maximum number of PDSCH in an SPS occasion.

In some implementations, the UE may also receive one or more of the SPS occasions with PDSCH retransmission information within a physical downlink control channel (PDCCH), the PDSCH retransmission information specifying one or more PDSCHs within one or more SPS occasions which were previously transmitted.

In another example, the UE may receive a physical downlink control channel (PDCCH) separate from the SPS occasions, the PDCCH providing PDSCH retransmission information to the UE and specifying one or more SPS occasions in which previously transmitted PDSCH are to be retransmitted.

In one implementation, the UE may seek to conserve power during SPS occasions. To do this, the UE may receive an indication from the base station specifying when one or more PDSCH within an SPS occasion are empty or will not be transmitted. The UE may then switch to or enter a power savings mode during time periods when the one or more PDSCH within the SPS occasion are indicated to be empty or will not be transmitted. For instance, the UE may turn off its receiver or transceiver chain/circuit when no PDSCH is expected (or an empty PDSCH is expected) within an SPS occasion.

These and other aspects of the disclosure will become more fully understood upon a review of the detailed description, which follows. Other aspects, features, and examples of the present disclosure will become apparent to those of ordinary skill in the art, upon reviewing the following description of specific, example examples of the present disclosure in conjunction with the accompanying figures. While features of the present disclosure may be discussed relative to certain examples and figures below, all examples of the present disclosure can include one or more of the advantageous features discussed herein. In other words, while one or more examples may be discussed as having certain advantageous features, one or more of such features may also be used in accordance with the various examples of the disclosure discussed herein. In similar fashion, while example examples may be discussed below as device, system, or method examples it should be understood that such example examples can be implemented in various devices, systems, and methods.

DETAILED DESCRIPTION

Figure 1:
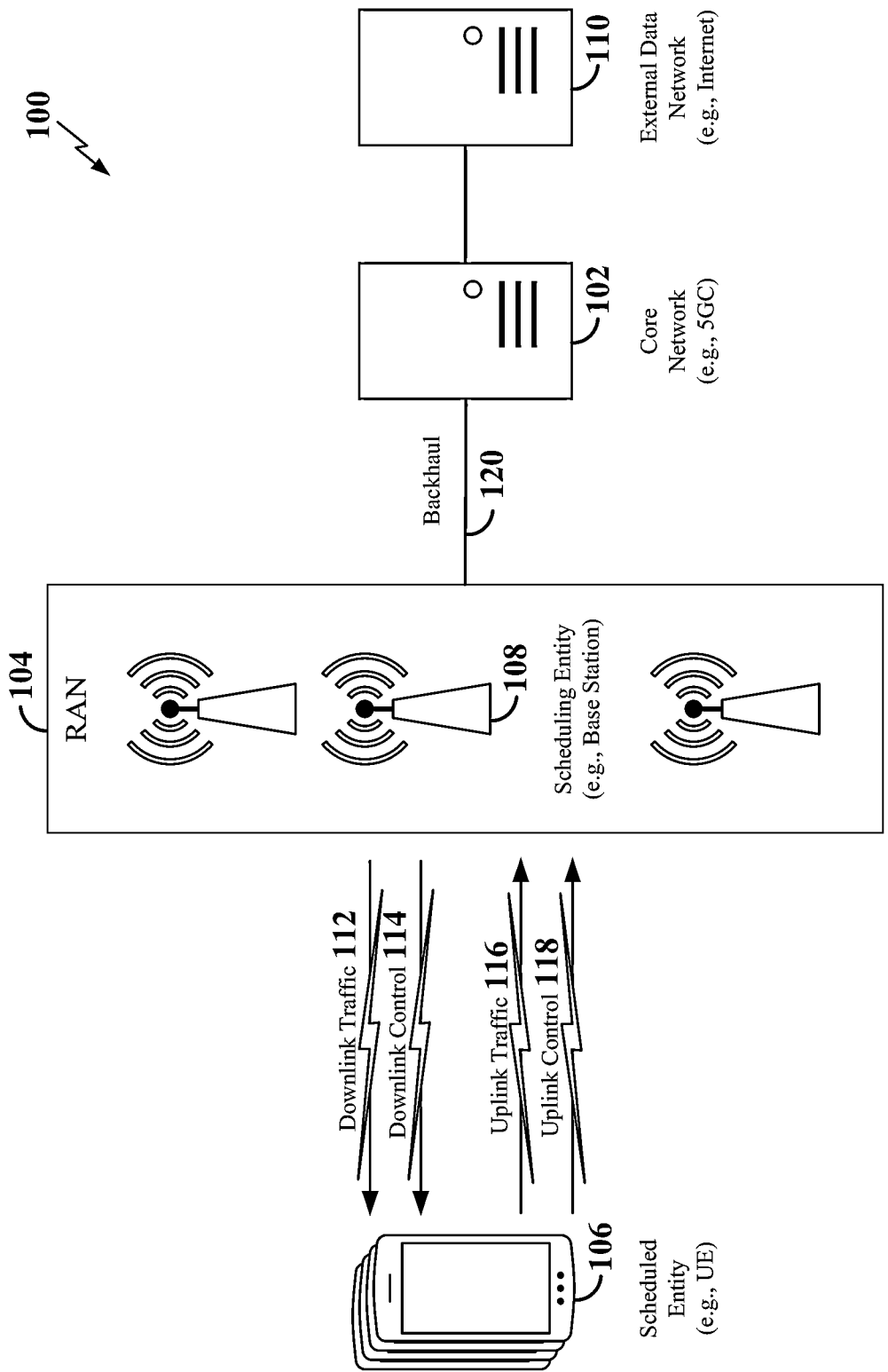
FIG. 1 is a schematic illustration of a wireless communication system according to some aspects.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form to avoid obscuring such concepts.

According to one aspect, while communicating over a 5G network, traffic between a base station and UE may have varying and/or changing characteristics. In order to accommodate traffic streams of different characteristics, periodic semi-persistent scheduling (SPS) occasions may be defined by a base station to carry multiple channels to the UE. Each channel may have one or more slots and may use distinct modulation and/or encoding schemes.

According to another aspect, the SPS occasions may be dynamically modified to add or subtract channels, thereby adjusting the SPS occasions according to changing traffic requirements.

Another aspect provides hybrid automatic repeat request (HARQ) and acknowledgments (ACK) from the UE to the base station to indicate which slots should be retransmitted. The base station may use signaling to indicate where such retransmissions are to occur. HARQ process identifiers (IDs) may be used to allow identification of the retransmitted slots.

Yet another aspect provides for each SPS occasion and/or channels therein to be transmitted over the same or different downlink beams. Similarly, HARQ-ACK from the UE to the base station may be transmitted over the same or different uplink beams for each SPS occasion.

Moreover, the UE may implement power savings using discontinuous reception during the SPS occasions. To do this, the base station may provide the UE with information about which channels in an SPS occasion are empty or may be skipped.

While aspects and examples are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, examples and/or uses may come about via integrated chip examples and other non-module-component based devices (e.g., end-user devices, vehicles, communication devices, computing devices, industrial equipment, retail/purchasing devices, medical devices, artificial intelligence-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described examples. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes and constitution.

The various concepts presented throughout this disclosure may be implemented across a broad variety of telecommunication systems, network architectures, and communication standards.

FIG. 1, as an illustrative example without limitation, shows various aspects of the present disclosure with reference to a wireless communication system 100. The wireless communication system 100 includes three interacting domains: a core network 102, a radio access network (RAN) 104, and at least one scheduled entity 106. The at least one scheduled entity 106 may be referred to as a user equipment (UE) 106 in the discussion that follows. The RAN 104 includes at least one scheduling entity 108. The at least one scheduling entity 108 may be referred to as a base station (BS) 108 in the discussion that follows. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to $3^{rd}$ Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), a transmission and reception point (TRP), or some other suitable terminology. In some examples, a base station may include two or more TRPs that may be co-located or non-co-located. The TRPs may communicate on the same carrier frequency or different carrier frequencies within the same frequency band or different frequency bands.

The radio access network 104 is further illustrated supporting wireless communication for multiple mobile apparatuses. A mobile apparatus may be referred to as user equipment (UE) in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services.

Within the present document, a "mobile" apparatus need not necessarily have a capability to move, and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of Things" (IoT). A mobile apparatus may additionally be an automotive or other transportation vehicle, a remote sensor or actuator, a robot or robotics device, a satellite radio, a global positioning system (GPS) device, an object tracking device, a drone, a multicopter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc.; an industrial automation and enterprise device; a logistics controller; agricultural equipment; military defense equipment, vehicles, aircraft, ships, and weaponry, etc. Still further, a mobile apparatus may provide for connected medicine or telemedicine support, i.e., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between a RAN 104 and a UE 106 may be described as utilizing an air interface. Transmissions over the air interface from a base station (e.g., base station 108) to one or more UEs (e.g., UE 106) may be referred to as downlink (DL) transmission. In some examples, the term downlink may refer to a point-to-multipoint transmission originating at a scheduling entity (described further below, e.g., base station 108). Another way to describe this point-to-multipoint transmission scheme may be to use the term broadcast channel multiplexing. Transmissions from a UE (e.g., UE 106) to a base station (e.g., base station 108) may be referred to as uplink (UL) transmissions. In some examples, the term uplink may refer to a point-to-point transmission originating at a scheduled entity (described further below, e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (e.g., one or more other UEs).

As illustrated in FIG. 1, a scheduling entity 108 may broadcast downlink traffic 112 to one or more scheduled entities 106. Broadly, the scheduling entity 108 is a node or device responsible for scheduling traffic in a wireless communication network, including the downlink traffic 112 and, in some examples, uplink traffic 116 and/or uplink control information 118 from one or more scheduled entities 106 to the scheduling entity 108. On the other hand, the scheduled entity 106 is a node or device that receives downlink control information 114, including but not limited to scheduling information (e.g., a grant), synchronization or timing information, or other control information from another entity in the wireless communication network such as the scheduling entity 108.

In addition, the uplink and/or downlink control information and/or traffic information may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols in some examples. A subframe may refer to a duration of 1 millisecond (ms). Multiple subframes or slots may be grouped together to form a single frame or radio frame. Of course, these definitions are not required, and any suitable scheme for organizing waveforms may be utilized, and various time divisions of the waveform may have any suitable duration.

In general, base stations 108 may include a backhaul interface for communication with a backhaul portion 120 of the wireless communication system. The backhaul 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100, and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
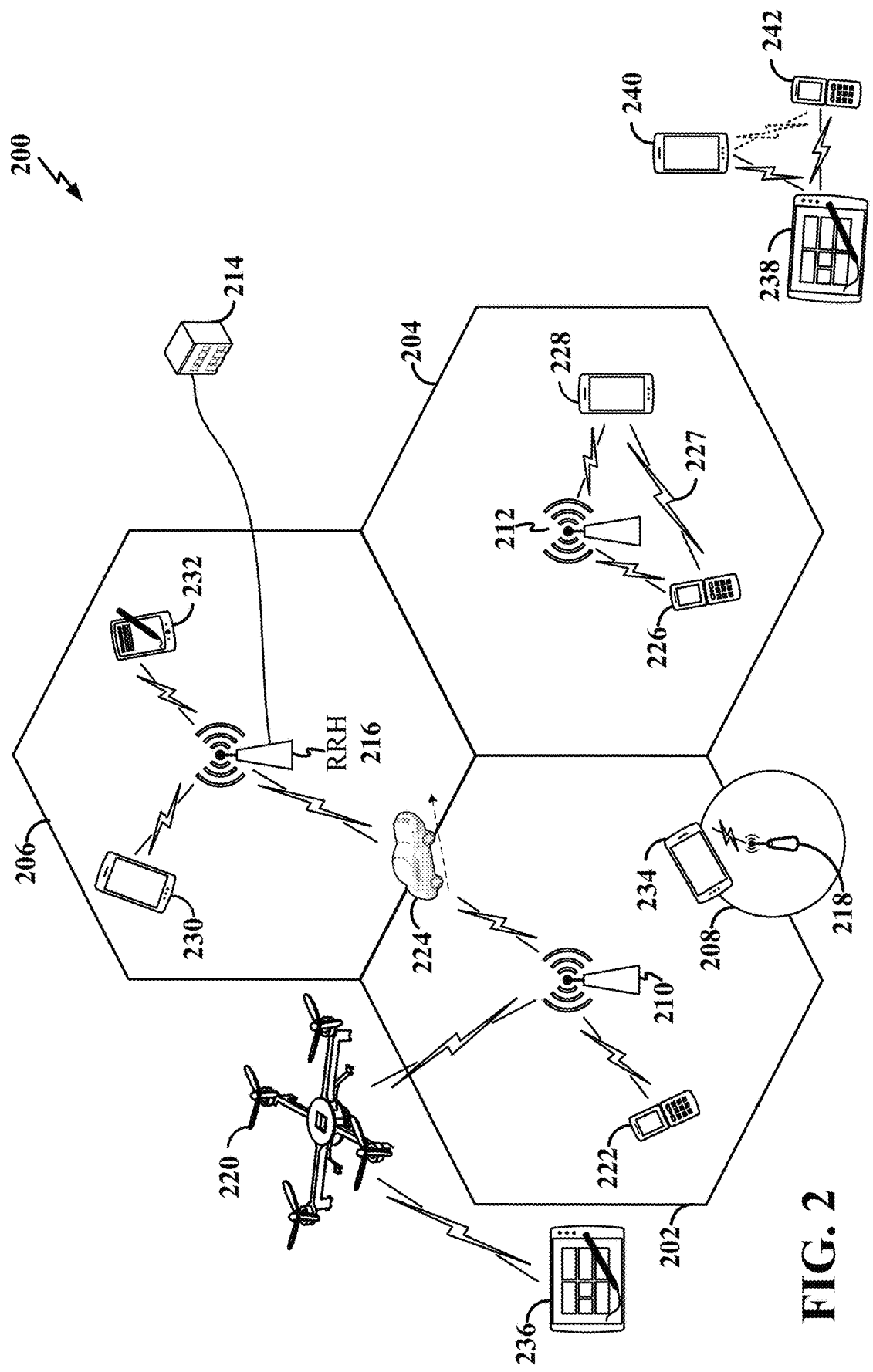
FIG. 2 is a conceptual illustration of an example of a radio access network according to some aspects.

Referring now to FIG. 2, by way of example and without limitation, a schematic illustration of a RAN 200 is provided. In some examples, the RAN 200 may be the same as the RAN 104 described above and illustrated in FIG. 1. The geographic area covered by the RAN 200 may be divided into cellular regions (cells) that can be uniquely identified by a user equipment (UE) based on an identification broadcasted from one access point or base station. FIG. 2 illustrates macrocells 202, 204, and 206, and a small cell 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

Various base station arrangements can be utilized. For example, in FIG. 2, two base stations 210 and 212 are shown in cells 202 and 204, and a third base station 214 is shown controlling a remote radio head (RRH) 216 in cell 206. That is, a base station can have an integrated antenna or can be connected to an antenna or RRH by feeder cables. In the illustrated example, the cells 202, 204, and 206 may be referred to as macrocells, as the base stations 210, 212, and 214 support cells having a large size. Further, a base station 218 is shown in the small cell 208 (e.g., a microcell, picocell, femtocell, home base station, home Node B, home eNode B, gNodeB, etc.) which may overlap with one or more macrocells. In this example, the cell 208 may be referred to as a small cell, as the base station 218 supports a cell having a relatively small size. Cell sizing can be done according to system design as well as component constraints.

It is to be understood that the radio access network 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as the base station/scheduling entity 108 described above and illustrated in FIG. 1.

Within the RAN 200, the cells may include UEs that may be in communication with one or more sectors of each cell. Further, each base station 210, 212, 214, and 218 may be configured to provide an access point to a core network (e.g., as illustrated in FIG. 1) for all the UEs in the respective cells. For example, UEs 222 and 224 may be in communication with base station 210, UEs 226 and 228 may be in communication with base station 212, UEs 230 and 232 may be in communication with base station 214 by way of RRH 216, and UE 234 may be in communication with base station 218. In some examples, the UEs 222, 224, 226, 228, 230, 232, 234, 236, 238, 240, and/or 242 may be the same as the UE/scheduled entity 106 described above and illustrated in FIG. 1.

In some examples, an unmanned aerial vehicle (UAV) 220, which may be a drone or quadcopter, can be a mobile network node and may be configured to function as a UE. For example, the UAV 220 may operate within cell 202 by communicating with base station 210. In some examples, a UAV 220 may be configured to function as a BS (e.g., serving a UE 236). That is, in some examples, a cell may not necessarily be stationary, and the geographic area of the cell may move according to the location of a mobile base station such as a UAV 220.

In the radio access network 200, the ability for a UE to communicate while moving, independent of its location, is referred to as mobility. The various physical channels between the UE and the radio access network are generally set up, maintained, and released under the control of an access and mobility management function (AMF). The AMF (not shown in FIG. 2) may include a security context management function (SCMF) that manages the security context for both the control plane and the user plane functionality, and a security anchor function (SEAF) that performs authentication.

A radio access network 200 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 224 (illustrated as a vehicle, although any suitable form of UE may be used) may move from the geographic area corresponding to its serving cell 202 to the geographic area corresponding to a neighbor cell 206. When the signal strength or quality from the neighbor cell 206 exceeds that of the serving cell 202 for a given amount of time, the UE 224 may transmit a reporting message to its serving base station 210 indicating this condition. In response, the UE 224 may receive a handover command, and the UE may undergo a handover to the cell 206.

In a network configured for UL-based mobility, UL reference signals from each UE may be utilized by the network to select a serving cell for each UE. In some examples, the base stations 210, 212, and 214/216 may broadcast unified synchronization signals (e.g., unified Primary Synchronization Signals (PSSs), unified Secondary Synchronization Signals (SSSs) and unified Physical Broadcast Channels (PBCH)). The UEs 222, 224, 226, 228, 230, and 232 may receive the unified synchronization signals, derive the carrier frequency and slot timing from the synchronization signals, and in response to deriving timing, transmit an uplink pilot or reference signal. The uplink pilot signal transmitted by a UE (e.g., UE 224) may be concurrently received by two or more cells (e.g., base stations 210 and 214/216) within the radio access network 200. Each of the cells may measure a strength of the pilot signal, and the radio access network (e.g., one or more of the base stations 210 and 214/216 and/or a central node within the core network) may determine a serving cell for the UE 224. As the UE 224 moves through the radio access network 200, the network may continue to monitor the uplink pilot signal transmitted by the UE 224. When the signal strength or quality of the pilot signal measured by a neighboring cell exceeds that of the signal strength or quality measured by the serving cell, the network 200 may handover the UE 224 from the serving cell to the neighboring cell, with or without informing the UE 224.

Although the synchronization signal transmitted by the base stations 210, 212, and 214/216 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In various implementations, the air interface in the radio access network 200 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without the need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30

GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

The air interface in the radio access network 200 may utilize one or more multiplexing and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

The air interface in the radio access network 200 may further utilize one or more duplexing algorithms Duplex refers to a point-to-point communication link where both endpoints can communicate with one another in both directions. Full-duplex means both endpoints can simultaneously communicate with one another. Half-duplex means only one endpoint can send information to the other at a time. Half-duplex emulation is frequently implemented for wireless links utilizing time division duplex (TDD). In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot. In a wireless link, a full-duplex channel generally relies on physical isolation of a transmitter and receiver, and suitable interference cancelation technologies. Full-duplex emulation is frequently implemented for wireless links by utilizing frequency division duplex (FDD) or spatial division duplex (SDD). In FDD, transmissions in different directions operate at different carrier frequencies. In SDD, transmissions in different directions on a given channel are separate from one another using spatial division multiplexing (SDM). In other examples, full-duplex communication may be implemented within unpaired spectrum (e.g., within a single carrier bandwidth), where transmissions in different directions occur within different sub-bands of the carrier bandwidth. This type of full-duplex communication may be referred to as sub-band full-duplex (SBFD), also known as flexible duplex.

In a further aspect of the RAN 200, sidelink signals may be used between UEs without necessarily relying on scheduling or control information from a base station. For example, two or more UEs (e.g., UEs 226 and 228 (or UEs 240 and 242)) may communicate with each other using peer to peer (P2P) or sidelink signals 227 (or 244) without relaying that communication through a base station (e.g., base station 212). In a further example, UE 238 is illustrated communicating with UEs 240 and 242. Here, the UE 238 may function as a scheduling entity or a primary sidelink device, and UEs 240 and 242 may function as a scheduled entity or a non-primary (e.g., secondary) sidelink device. In still another example, a UE may function as a scheduling entity in a device-to-device (D2D), peer-to-peer (P2P), or vehicle-to-vehicle (V2V) network, and/or in a mesh network. In a mesh network example, UEs 240 and 242 may optionally communicate directly with one another in addition to communicating with the UE 238 (e.g., functioning as a scheduling entity). Thus, in a wireless communication system with scheduled access to time-frequency resources and having a cellular configuration, a P2P configuration, or a mesh configuration, a scheduling entity and one or more scheduled entities may communicate utilizing the scheduled resources. In some examples, the sidelink signals 227 (or 244) include sidelink traffic (e.g., a physical sidelink shared channel) and sidelink control (e.g., a physical sidelink control channel).

In some examples, two or more UEs (e.g., UEs 226 and 228) within the coverage area of a serving base station 212 may communicate with both the base station 212 using cellular signals and with each other using direct link signals (e.g., sidelink signals 227) without relaying that communication through the base station. In an example of a V2X network within the coverage area of the base station 212, the base station 212 and/or one or both of the UEs 226 and 228 may function as scheduling entities to schedule sidelink communication between UEs 226 and 228.

Figure 3:
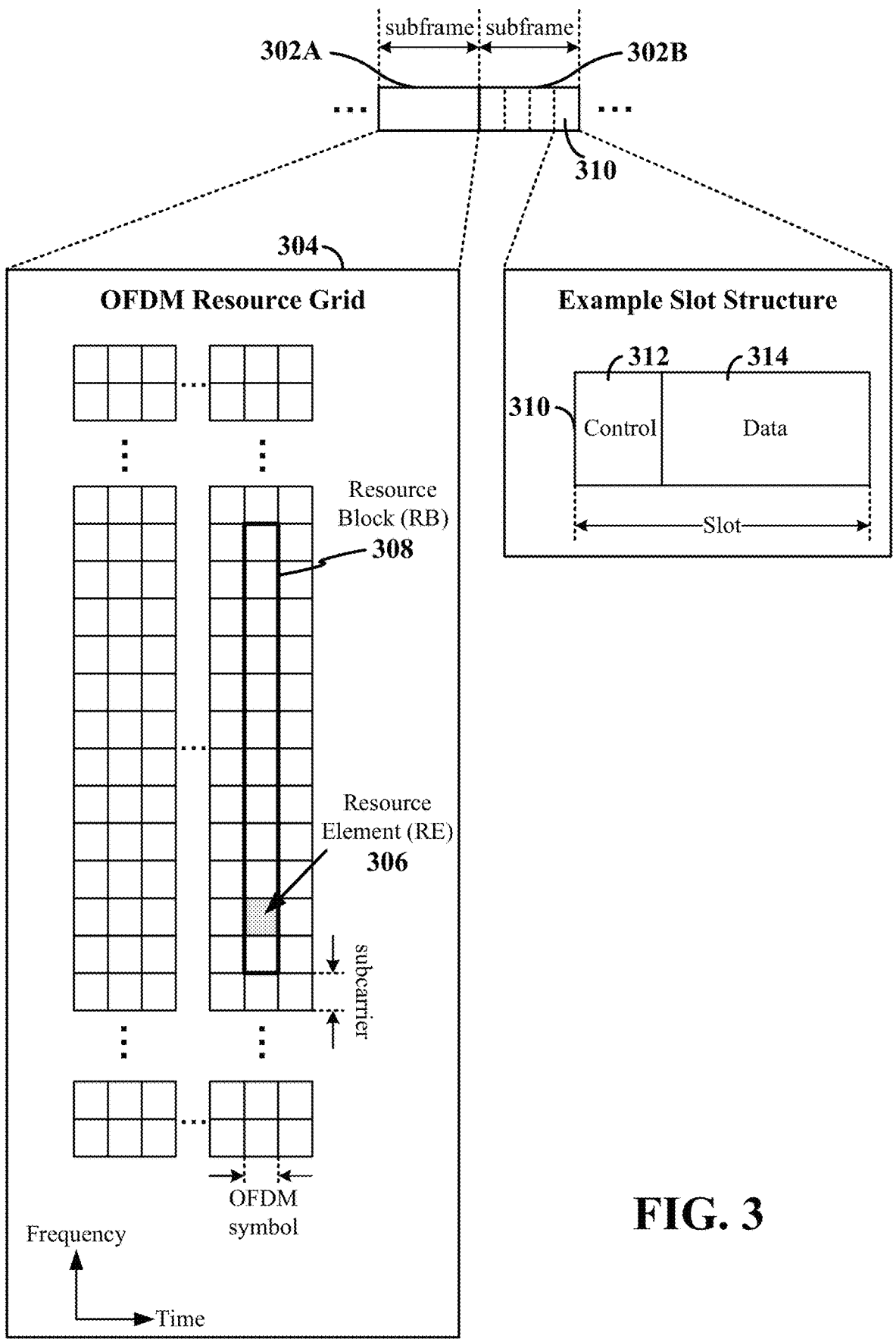
FIG. 3 is a schematic illustration of an example of wireless resources in an air interface utilizing orthogonal frequency divisional multiplexing (OFDM) according to some aspects.

Various aspects of the present disclosure will be described with reference to an OFDM waveform, an example of which is schematically illustrated in FIG. 3. It should be understood by those of ordinary skill in the art that the various aspects of the present disclosure may be applied to an SC-FDMA waveform in substantially the same way as described herein below. That is, while some examples of the present disclosure may focus on an OFDM link for clarity, it should be understood that the same principles may be applied as well to SC-FDMA waveforms.

Referring now to FIG. 3, an expanded view of an example DL subframe (SF) 302A is illustrated, showing an OFDM resource grid 304. However, as those skilled in the art will readily appreciate, the physical layer (PHY) transmission structure for any particular application may vary from the example described here, depending on any number of factors. Here, time is in the horizontal direction with units of OFDM symbols, and frequency is in the vertical direction with units of subcarriers. 5G NR supports a scalable numerology where different numerologies may be used for different radio frequency spectrums, different bandwidths, and the like. For example, sub-carrier spacings (SCSs) of 15 kHz, 30 kHz, 60 kHz, etc., may be used in different scenarios.

The resource grid 304 may be used to schematically represent time-frequency resources for a given antenna port. That is, in a multiple-input-multiple-output (MIMO) implementation with multiple antenna ports available, a corresponding multiple number of resource grids 304 may be available for communication. The resource grid 304 is divided into multiple resource elements (REs) 306. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 308, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 308 entirely corresponds to a single direction of communication (either transmission or reception for a given device).

Scheduling of UEs (e.g., scheduled entities) for downlink, uplink, or sidelink transmissions typically involves scheduling one or more resource elements 306 within one or more sub-bands or bandwidth parts (BWPs). Each BWP may include two or more contiguous or consecutive RBs. Thus, a UE generally utilizes only a subset of the resource grid 304. In some examples, an RB may be the smallest unit of resources that can be allocated to a UE. Thus, the more RBs scheduled for a UE, and the higher the modulation scheme chosen for the air interface, the higher the data rate for the UE. The RBs may be scheduled by a base station (e.g., gNB, eNB, RSU, etc.) or may be self-scheduled by a UE implementing D2D sidelink communication.

In this illustration, the RB 308 is shown as occupying less than the entire bandwidth of the subframe 302A, with some subcarriers illustrated above and below the RB 308. In a given implementation, the subframe 302A may have a bandwidth corresponding to any number of one or more RBs 308. Further, in this illustration, the RB 308 is shown as occupying less than the entire duration of the subframe 302A, although this is merely one possible example.

Each 1 ms subframe 302A may consist of one or multiple adjacent slots. In the example shown in FIG. 3, one subframe 302B includes four slots 310, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots having a shorter duration (e.g., one or two OFDM symbols). These mini-slots may in some cases be transmitted occupying resources scheduled for ongoing slot transmissions for the same or for different UEs. Any number of resource blocks may be utilized within a subframe or slot.

An expanded view of one of the slots 310 illustrates the slot 310 including a control region 312 and a data region 314. In general, the control region 312 may carry control channels (e.g., PDCCH), and the data region 314 may carry data channels (e.g., PDSCH or PUSCH). Of course, a slot may contain all DL, all UL, or at least one DL portion and at least one UL portion. The structure illustrated in FIG. 3 is merely an example, and different slot structures may be utilized, and may include one or more of each of the control region(s) and data region(s).

Although not illustrated in FIG. 3, the various REs 306 within an RB 308 may be scheduled to carry one or more physical channels, including control channels, shared channels, data channels, etc. Other REs 306 within the RB 308 may also carry pilots or reference signals, including but not limited to a demodulation reference signal (DMRS), a control reference signal (CRS), or a sounding reference signal (SRS). These pilots or reference signals may provide for a receiving device to perform channel estimation of the corresponding channel, which may enable coherent demodulation/detection of the control and/or data channels within the RB 308.

In some examples, a slot 310 may be utilized for broadcast or unicast communication. In V2X or D2D networks, a broadcast communication may refer to a point-to-multipoint transmission by a one device (e.g., a vehicle, base station (e.g., RSU, gNB, eNB, etc.), UE, or other similar device) to other devices. A unicast communication may refer to a point-to-point transmission by a one device to a single other device.

In an example, the control region 312 of the slot 310 may include a physical downlink control channel (PDCCH) including downlink control information (DCI) transmitted by a base station (e.g., gNB, eNB, RSU, etc.) towards one or more of a set of UEs, which may include one or more sidelink devices (e.g., V2X/D2D devices). In some examples, the DCI may include synchronization information to synchronize communication by a plurality of sidelink devices on the sidelink channel. In addition, the DCI may include scheduling information indicating one or more resource blocks within the control region 312 and/or data region 314 allocated to sidelink devices for sidelink communication. For example, the control region 312 of the slot may further include control information transmitted by sidelink devices over the sidelink channel, while the data region 314 of the slot 310 may include data transmitted by sidelink devices over the sidelink channel. In some examples, the control information may be transmitted within a physical sidelink control channel (PSCCH), while the data may be transmitted within a physical sidelink shared channel (PSSCH).

In a DL transmission (e.g., over the Uu interface), the transmitting device (e.g., the scheduling entity) may allocate one or more REs 306 (e.g., within a control region 312) to carry DL control information including one or more DL control channels, such as a PBCH, and/or a physical downlink control channel (PDCCH), etc., to one or more scheduled entities. The transmitting device may further allocate one or more REs 306 to carry other DL signals, such as a DMRS, a phase-tracking reference signal (PT-RS), a channel state information-reference signal (CSI-RS), a primary synchronization signal (PSS), and a secondary synchronization signal (SSS).

The synchronization signals PSS and SSS, and in some examples, the PBCH and a PBCH DMRS, may be transmitted in a synchronization signal block (SSB) that includes 3 consecutive OFDM symbols, numbered via a time index in increasing order from 0 to 3. In the frequency domain, the SSB may extend over 240 contiguous subcarriers, with the subcarriers being numbered via a frequency index in increasing order from 0 to 239. Of course, the present disclosure is not limited to this specific SSB configuration. Other nonlimiting examples may utilize greater or fewer than two synchronization signals, may include one or more supplemental channels in addition to the PBCH, may omit a PBCH, and/or may utilize a different number of symbols and/or nonconsecutive symbols for an SSB, within the scope of the present disclosure.

The SSB may be used to send system information (SI) and/or provide a reference to SI transmitted via another channel Examples of system information may include, but are not limited to, subcarrier spacing, system frame number, a cell global identifier (CGI), a cell bar indication, a list of common control resource sets (coresets), a list of common search spaces, a search space for system information block 1 (SIB1), a paging search space, a random-access search space, and uplink configuration information. Two specific examples of coresets include PDCCH CORESET 0 and CORESET 1.

The PDCCH may carry downlink control information (DCI) including but not limited to power control commands, scheduling information, a grant, and/or an assignment of REs for DL and UL transmissions. The PHY carries HARQ feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission is confirmed, an ACK may be transmitted, whereas if not confirmed, a NACK may be transmitted. In response to a NACK, the transmitting device may send a HARQ retransmission, which may implement chase combining, incremental redundancy, etc.

In an UL transmission (e.g., over the Uu interface), the transmitting device (e.g., the scheduled entity) may utilize one or more REs 306 to carry UL control information including one or more UL control channels, such as a physical uplink control channel (PUCCH), to the scheduling entity. UL control information may include a variety of packet types and categories, including pilots, reference signals, and information configured to enable or assist in decoding uplink data transmissions. For example, the UL control information may include a DMRS or SRS. In some examples, the control information may include a scheduling request (SR), i.e., a request for the scheduling entity to schedule uplink transmissions. Here, in response to the SR transmitted on the control channel, the scheduling entity may transmit downlink control information that may schedule resources for uplink packet transmissions. UL control information may also include HARQ feedback, channel state feedback (CSF), or any other suitable UL control information.

In addition to control information, one or more REs 306 (e.g., within the data region 314) may be allocated for user data or traffic data. Such traffic may be carried on one or more traffic channels, such as, for a DL transmission, a PDSCH, or for an UL transmission, a physical uplink shared channel (PUSCH). In some examples, one or more REs 306 within the data region 314 may be configured to carry SIBs (e.g., SIB1), carrying system information that may enable access to a given cell.

The physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission. Each transport block (TB) may be comprised of multiple code blocks (CB), which may be grouped into CB groups (CBG).

The channels or carriers described above with reference to FIGS. 1-3 are not necessarily all of the channels or carriers that may be utilized between a scheduling entity and scheduled entities, and those of ordinary skill in the art will recognize that other channels or carriers may be utilized in addition to those illustrated, such as other traffic, control, and feedback channels.

Traffic between a base station and UE may have differing characteristics and delivery requirements. For instance, some multi-modal applications (e.g., virtual reality, augmented reality, etc.) may use concurrent or overlapping streams of video, audio, and/or data (e.g., haptic/tactile feedback, etc.), each having different traffic characteristics (e.g., transmission bursts, variable bandwidth requirements, etc.). In order to accommodate traffic of varying characteristics, semi-persistent scheduling (SPS) of transmissions may be used. With SPS, a scheduling entity defines occasions that occur with a certain periodicity in which transmissions may take place. For instance, SPS occasions may be scheduled to occur every n subframes (where n is an integer number) until further notice. Therefore, SPS reduces control signaling overhead for those transmissions.

In order to accommodate concurrent or overlapping traffic streams to a UE, multiple slots may be used in each SPS occasion, with a channel occupying one or more slots, and each channel capable of carrying a stream. In an example, the channels may be physical downlink shared channels (PDSCH).

Figure 4:
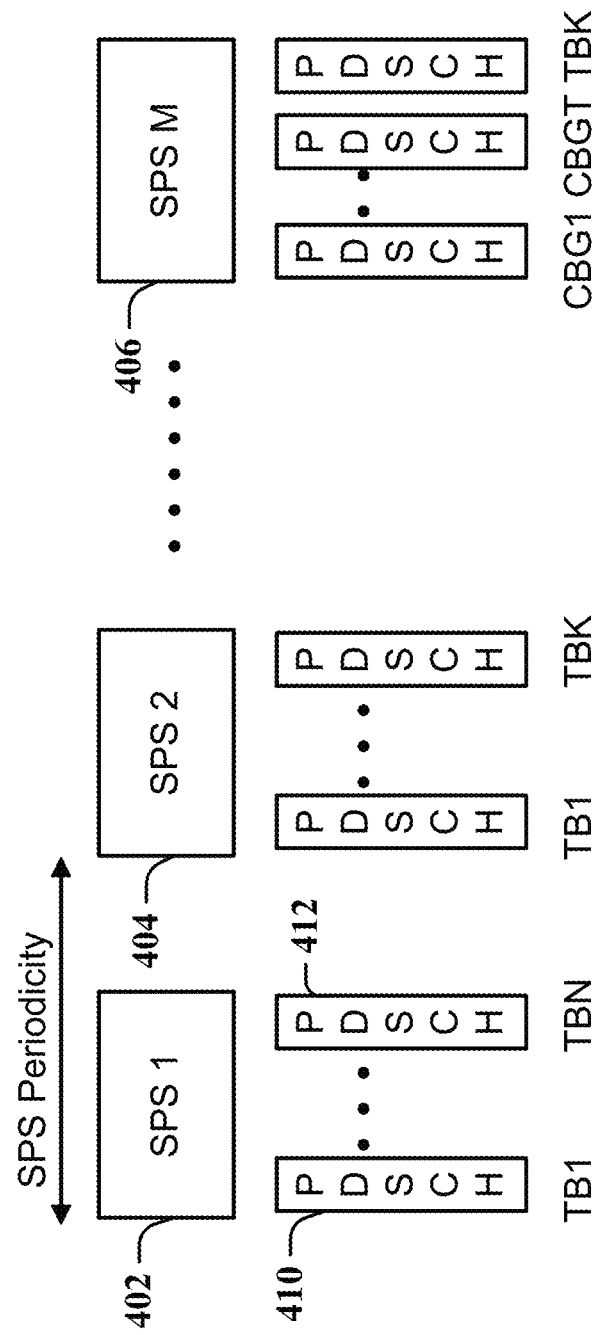
FIG. 4 illustrates an example of multi-slot semi-persistent scheduling occasions carrying multiple channels.

FIG. 4 illustrates an example of multi-slot semi-persistent scheduling occasions carrying multiple channels. Here, a plurality of periodic SPS occasions 402, 404, and 406 are shown, each SPS occasion 402 containing multiple or a plurality of physical download shared channels (PDSCH) 410 and 412, with each PDSCH spanning or mapping to one or more slots. In some exemplary implementations, each of the plurality of PDSCH 410 and 412 may serve to carry different types of traffic (e.g., audio, video, data, haptic information, etc.).

In one example, one PDSCH 410 may span multiple slots (e.g., one TB with multiple CBGs). In various implementations, each PDSCH 410 and 412 may span a different number of slots.

In another example, multiple PDSCH 410 and 412 may span the entire SPS occasion 402 (e.g., multiple slots or TBs). That is, the entire SPS occasion 410 may include multiple or a plurality of physical download shared channels (PDSCH) 410 and 412, with each PDSCH spanning or mapping to one or more slots.

In yet another example, in order to achieve transmission diversity, data may be repeated in different slots within an SPS occasion or slots in different SPS occasions.

Figure 5:
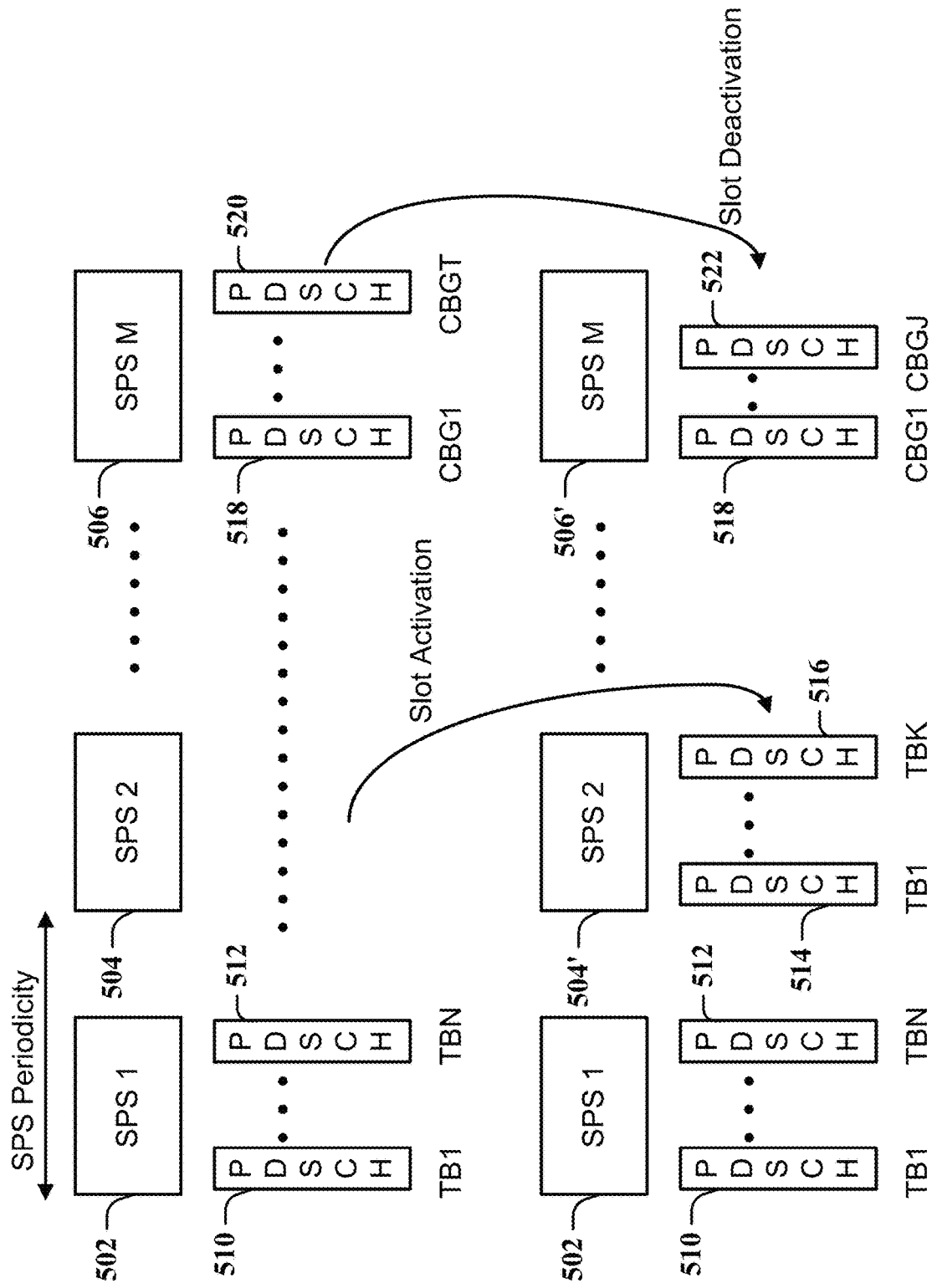
FIG. 5 illustrates an example of how slots in multi-slot semi-persistent scheduling occasions may be dynamically activated and/or deactivated.

FIG. 5 illustrates an example of how slots in multi-slot semi-persistent scheduling occasions may be dynamically activated and/or deactivated. A plurality of periodic SPS occasions 502, 504, and 506 are shown, each SPS occasion may contain multiple or a plurality of physical download shared channels (PDSCH), with each PDSCH spanning or mapping to one or more slots. According to one aspect, the number of slots in each SPS occasion 502 and 504 may be different or dynamically adjusted (e.g., using signaling). This provides flexibility for data bursts or traffic with different requirements. In this example, a first SPS occasion 502 may include N of slots to carry the PDSCHs 510 and 512, while a second SPS occasion 504 may have no slots allocated for the PDSCH (e.g., no traffic is sent).

A scheduling entity (e.g., base station) may dynamically activate or deactivate slots within each SPS occasion. For instance, the second SPS occasion 504, which at a time t0 may have no slots allocated, may be reconfigured as second SPS occasion 504' at a later time t1 to include K slots (which may be referred to as "slot activation") which now carry PDSCHs 514 and 516. Similarly, a third SPS occasion 506, which at a time t0 may have T slots allocated to carry PDSCHs 518 and 520, may be reconfigured as third SPS occasion 506' at a later time t1 to include J slots to carry PDSCH 518 and 522, where J<T, (which may be referred to as "slot deactivation"). Effectively, slots for PDSCH 520 have been eliminated.

The flexible and dynamic allocation/configuration of slots within each SPS occasion may alleviate the need for defining multiple SPS configurations. Additionally, the maximum number of slots per SPS occasion may be configured via radio resource control (RRC) signaling. For instance, the number of slots per occasion may be dynamically signaled using L1/L2 signaling.

According to another aspect, each PDSCH within an SPS occasion may employ different modulation and/or coding schemes. Consequently, the amount of data (e.g. number of bits) transmitted in each slot may also differ.

Figure 6:
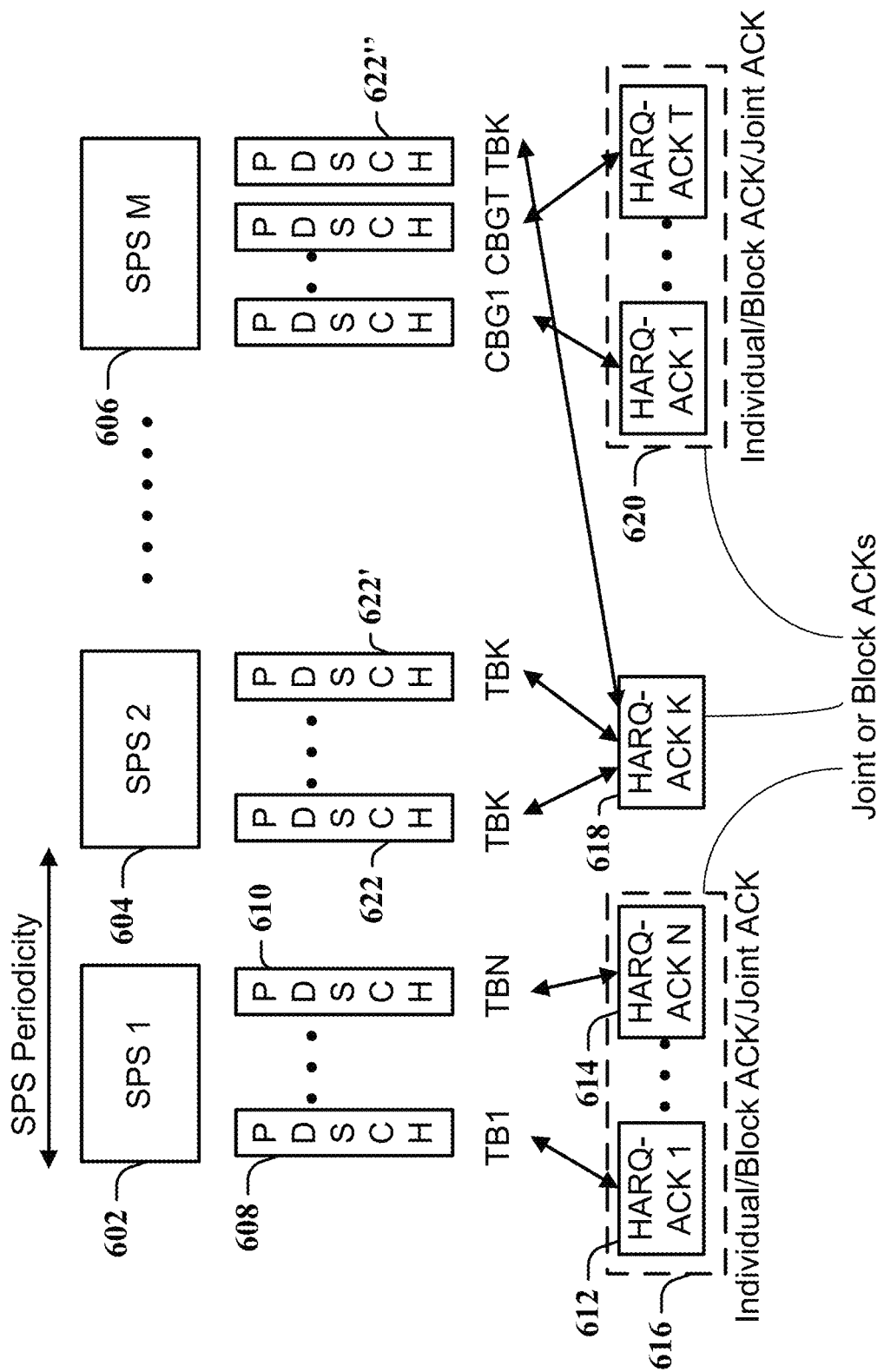
FIG. 6 illustrates an example of a hybrid automatic repeat request (HARQ) and acknowledgement (ACK) mechanism that may be used with multi-slot semi-persistent scheduling occasions.

FIG. 6 illustrates an example of a hybrid automatic repeat request (HARQ) and acknowledgement (ACK) mechanism that may be used with multi-slot semi-persistent scheduling occasions. HARQ is a combination of high-rate forward error correction (FEC) and automatic repeat request (ARQ) error controls while ACKs are used to indicate whether a particular transmission was correctly or incorrectly received. In one implementation, a receiving UE may send HARQ-ACK to a transmitting base station to indicate which transmissions were correctly or incorrectly received and/or which transmissions may need to be retransmitted.

A plurality of periodic SPS occasions 602, 604, and 606 are shown, each SPS occasion may contain multiple or a plurality of physical download shared channels (PDSCH) 608 and 610, with each PDSCH spanning or mapping to one or more slots.

In a first approach, an individual HARQ-ACK 612 or 614 may be sent for each slot, TB, or PDSCH, to indicate whether a retransmission of said slot, TB, or PDSCH is requested. This approach provides great granularity in requesting retransmissions at the expense of increased signaling.

In a second approach, a joint ACK 616 or 620 may be generated and sent for multiple slots over multiple SPS occasions. The joint ACK 616 or 620 may include, for a plurality of slots over one or more SPS occasions, no-ACKs (NACK) only, or ACKs only, or both ACKs/NACKs with HARQs.

In a third approach, where a PDSCH is repeated within one or more SPS occasion, a single HARQ-ACK may be sent. For example for a repeating PDSCH 622, 622' and 622", a single HARQ-ACK 618 may be sent.

For joint or block ACKs 616 or 620, various groupings may be implemented for the joint or block ACKs. Grouping may include NACK/ACKs across multiple SPS occasions or even across various SPS configurations. Grouping may be combined based on factors such as: 1) time of arrival, 2) priorities derived from quality of service requirements, 3) belonging to a same SPS occasion or configuration, or 4) and other criteria. Additionally, out-of-order ACKs/NACKs may be sent in joint or block ACKs.

Figure 7:
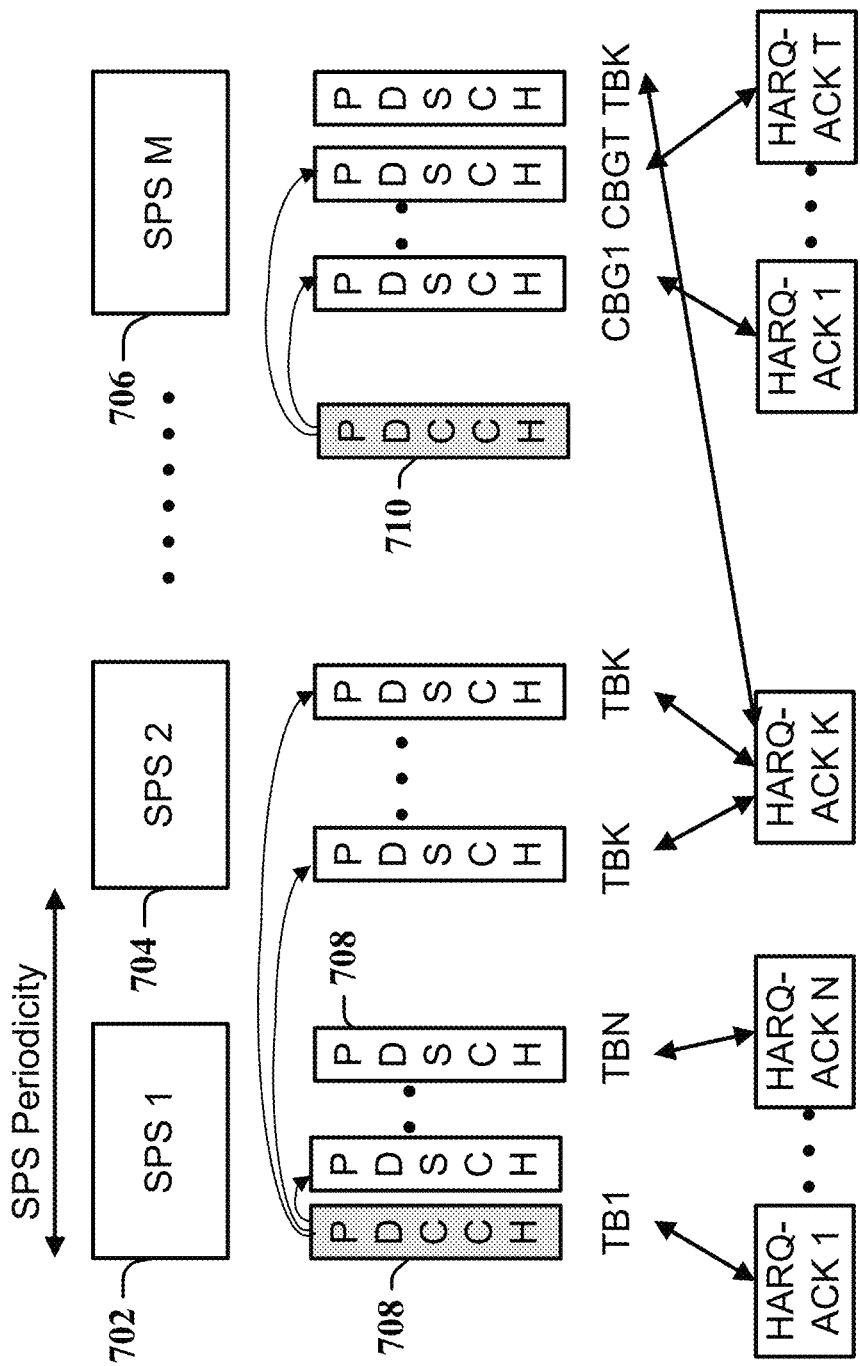
FIG. 7 illustrates a diagram of a scheme for retransmitting PCSCH within multi-slot SPS occasions.

FIG. 7 illustrates a diagram of a scheme for retransmitting PCSCH within multi-slot SPS occasions. Having received ACKs/NACKs from a UE, a sender (e.g., base station) may then seek to retransmit those slots, TBs, or PDSCHs for which retransmission is requested by the UE. The sender may indicate which PDSCH are retransmitted in various ways.

In a first approach, a downlink control information (DCI) within a physical downlink control channel (PDCCH) 710 that is outside an SPS occasion may be used to indicate which upcoming slots, PDSCH, or TBs, are being used for retransmissions.

In a second approach, a PDCCH 708 may override/replace a PDSCH in a first slot of an SPS occasion 702, and serves to indicate which upcoming slots, PDSCH, or TBs, are being used for retransmissions. In this approach, a receiving UE may have to perform blind detection on that slot to identify the PDCCH is being sent instead of a PDSCH.

In a third approach, a first slot in each SPS occasion 702, 704, or 706 may be preconfigured to transmit a PDCCH 708, and this PDCCH 708 indicates which upcoming slots, PDSCH, or TBs, are being used for retransmissions.

In any of these approaches, a DCI may be used to schedule retransmissions for PDSCHs across one or more SPS occasions.

In order to perform retransmission of a slot, PDSCH, or part thereof, the slots being transmitted need to be identified. For instance, a HARQ process identifier (ID) may be computed as:

$$\text{HARQ Process ID} = [\text{floor (CURRENT\_slot/periodicity)}] \text{ modulo } nrof\text{HARQ-Processes} + \text{harq-procID-offset}, \quad \text{(Equation 1)}$$

where

CURRENT_slot=[(SFN×numberOfSlotsPerFrame)+slot number in the frame],

SFN refers to a system frame number, numberOfSlotsPerFrame refers to the number of consecutive slots per frame, periodicity refers to the periodicity of the SPS occasions, nrofHARQ-Processes is the number of HARQ processes for the SPS occasions, harq-procID-offset is an offset of HARQ process for the SPS occasions.

However, such HARQ process ID does not account for multi-slot SPS occasions. Therefore, a modified HARQ process identifier (ID) may be computed as:

$$\text{HARQ Process ID} = [[\text{floor}(\text{CURRENT\_slot modulo}/V)] + (N)^*[\text{floor}(\text{CURRENT\_slot/periodicity}) \text{ modulo } nrof\text{HARQ-Processes}/N]] + \text{harq-procID-offset}, \quad \text{(Equation 2)}$$

where

CURRENT_slot=[(SFN×numberOfSlotsPerFrame)+slot number in the frame],

SFN refers to a system frame number, numberOfSlotsPerFrame refers to the number of consecutive slots per frame, N is the maximum number of PDSCH slots transmitted within one SPS occasion, periodicity refers to the periodicity of the SPS occasions, nrofHARQ-Processes is the number of HARQ processes for the SPS occasions, harq-procID-offset is an offset of HARQ process for the SPS occasions.

Note that, if no PDSCH transmission occurs in a slot, the corresponding HARQ Process ID for that slot is skipped.

Figure 8:
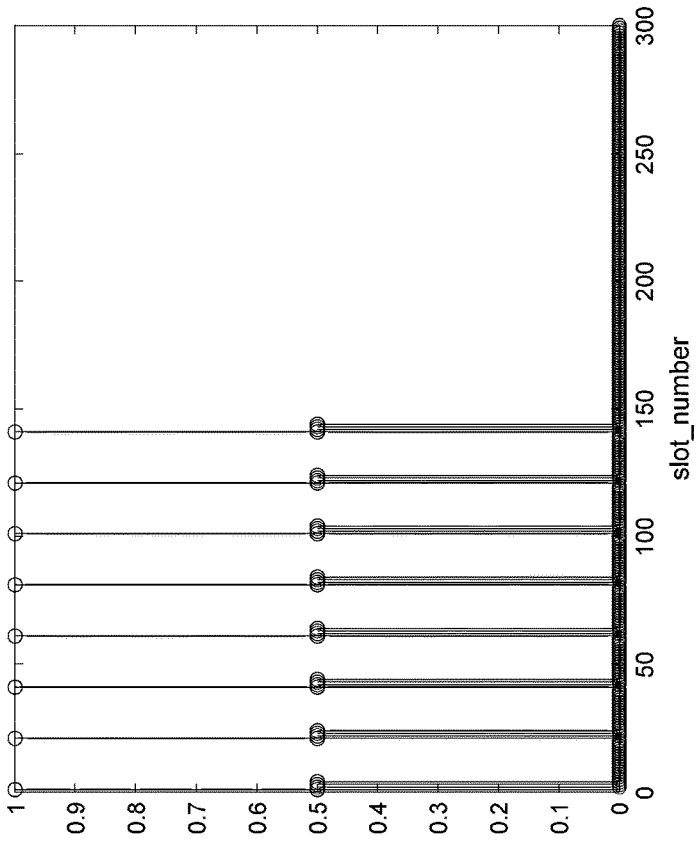
FIG. 8 illustrates one example of how HARQ IDs may be computed for a multi-slot SPS occasion.

FIG. 8 illustrates one example of how HARQ IDs may be computed for a multi-slot SPS occasion. In this example, a periodicity of 20 slots is used. Using Equation 1 (i.e., single slot within an SPS occasion), the possible HARQ IDs are 0, 1, 2, 3, 4, 5, 6, 7 when the maximum number of processes per slot is 8. Using Equation 2 (i.e., multiple slots within an SPS occasion), the possible HARQ IDs are 0, 1, 2, 3, 4, 5, 6, 7, ... 31 when the maximum number of processes per slot is 32.

Figure 9:
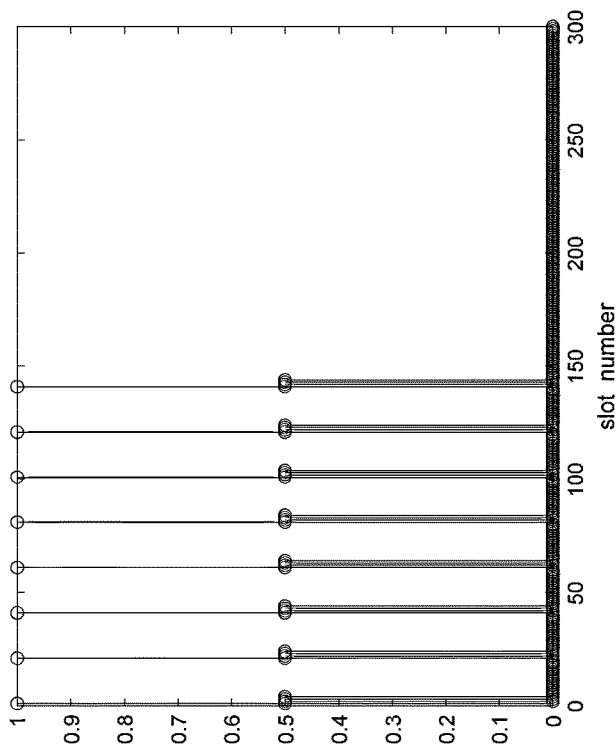
FIG. 9 illustrates another example of how HARQ IDs may be computed for a multi-slot SPS occasion.

FIG. 9 illustrates another example of how HARQ IDs may be computed for a multi-slot SPS occasion. In this example, a periodicity of 10 slots is used. Using Equation 1 (i.e., single slot within an SPS occasion), the possible HARQ IDs are 0, 1, 2, 3, 4, 5, 6, 7 when the maximum number of processes per slot is 8. Using Equation 2 (i.e., multiple slots within an SPS occasion), the possible HARQ IDs are 0, 1, 2, 3, 6, 7, 4, 5, 8, 9, 10, 11, 14, 15, 12, 13, 16, 17, 18, 19, 22, 23, 20, 21, 24, 25, 26, 27, 30, 31, 28, and 29 when the maximum number of processes per slot is 32.

For individual slot retransmissions, HARQ IDs may be included in a DCI within a PDCCH.

For group slot retransmissions, while a base station could indicate individual HARQ IDs for each of the process in the group of processes to be retransmitted, the signaling overhead may might be significant. To reduce the signaling overhead, the base station may send a compressed HARQ ID. For instance, for consecutive HARQ process retransmissions the base station may provide a root HARQ ID and a number of consecutive PDSCHs to be transmitted. The root HARQ ID is the HARQ ID of a PDSCH in the SPS occasion to be retransmitted. For instance, the root HARQ ID could be the HARQ ID of a first PDSCH which is followed by a plurality of M PDSCHs to be retransmitted. For instance, when a root HARQ ID is used, a PDSCH associated with that root HARQ ID plus an additional M−1 PDSCHs in the sequence are to be retransmitted. In the example of using Equation 2 to generate HARQ IDs, the groups of processes may be defined with M=8 HARQ IDs each, such that:

Group 1: HARQ IDs 0, 1, 2, 3, 6, 7, 4, 5 (root HARQ=0),
Group 2: HARQ IDs 8, 9, 10, 11, 14, 15, 12, 13 (root HARQ=8),
Group 3: HARQ IDs 16, 17, 18, 19, 22, 23, 20, 21 (root HARQ=16),
Group 4: HARQ IDs 24, 25, 26, 27, 30, 31, 28, 29 (root HARQ=24).

At the receiving UE, the root HARQ ID and the number M of consecutive HARQ process IDs are obtained. The UE may use the HARQ ID Equation 2 for the multi-slot PDSCH to derive the corresponding HARQ process IDs. Alternatively, where the periodicity and other parameters are predefined, the sequence of HARQ process IDs may be pre-computed and stored, or may be received/retrieved from storage.

Figure 10:
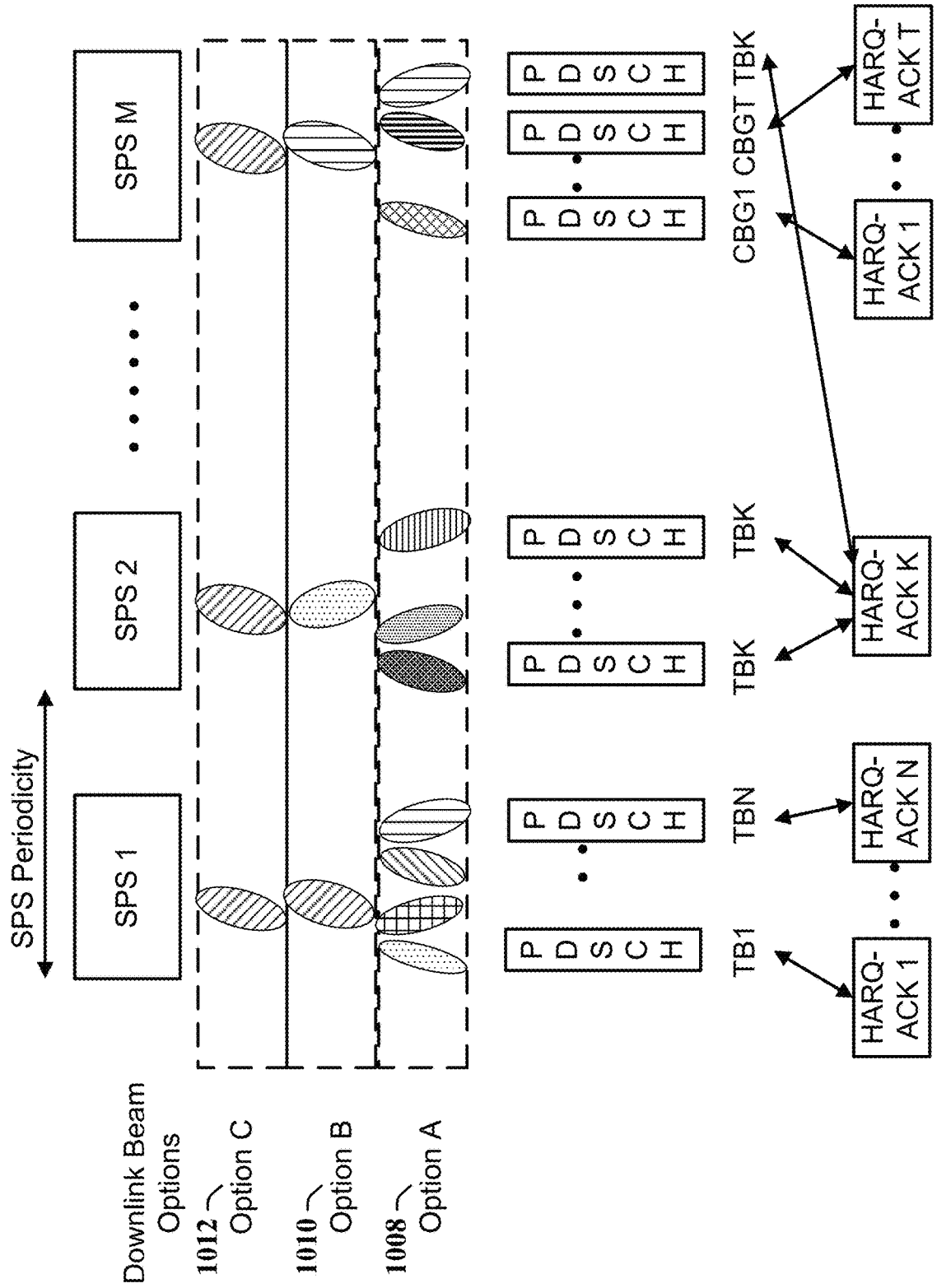
FIG. 10 is a diagram illustrating various downlink beam options that may be used for multi-slot SPS occasion transmissions.

FIG. 10 is a diagram illustrating various downlink beam options that may be used for multi-slot SPS occasion transmissions. According to a first option (Option A) 1008, different beams are used for transmitting PDSCHs in the same SPS occasion or even across all slots in the SPS configuration (i.e., all SPS occasions). The beams to be used may be configured through a Transmission Configuration Indicator (TCI) via an RRC message that the base station sends the UE. The beams to be used may be activated/deactivated via L1/L2 signaling using a scheduling PDCCH. The base station may dynamically change beams pattern by sending al new TCI with beam patterns for slots in each occasion or in all the occasions in an SPS configuration.

In a second option (Option B) 1010, the same beam can be used for PDSCHs in the same SPS occasion. For instance, a single beam may be selected for transmission of all PDSCHs in a first SPS occasion, but different beams may be used for each SPS occasion.

In a third option (Option C) 1012, the same beam may be used for PDSCHs across all slot in the SPS configuration (e.g., for all SPS occasions).

For the second option 1010 and third option 1012, an initial downlink beam sweep may be performed, and the best beam(s) may be determined.

Figure 11:
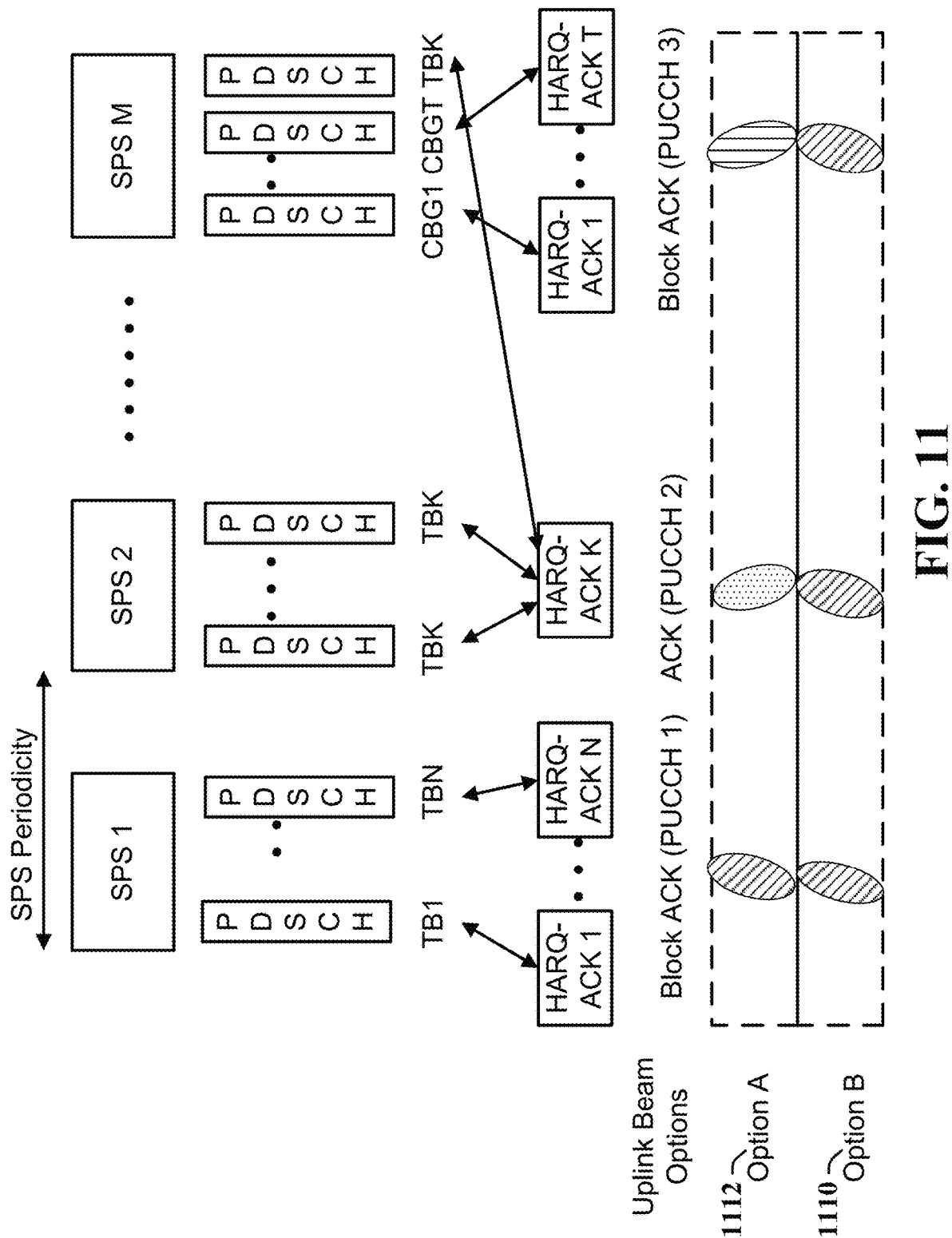
FIG. 11 is a diagram illustrating various uplink beam options that may be used for acknowledgments of multi-slot SPS occasion transmissions.

FIG. 11 is a diagram illustrating various uplink beam options that may be used for acknowledgments of multi-slot SPS occasion transmissions. In a first option 1102, different uplink beams may be used to transmit a block of acknowledgements for transmissions received in different SPS occasions, but the same uplink beam may be used for all ACKs associated with transmissions in the same SPS occasion. The base station may utilize Transmission Configuration Indicators (TCIs) configured via RRC to indicate uplink beams or beam patterns, and the uplink beams may be activated/deactivated via L1/L2 signaling. Similarly, a base station may utilize L1/L2 signaling to indicate new TCI patterns (e.g., new uplink beams or new beam patterns) for PUCCHs carrying the block ACKs.

In a second option 1104, the same uplink beams may be used to transmit a block of acknowledgements for transmissions received in all SPS occasions. Based on initial uplink beam sweep, the best beam maybe determined and used for all PUCCHs carrying acknowledgements from the UE to the base station. The best available beam may be updated based on measurements or downlink TCI updates if there is beam correspondence.

In order to conserve power on a UE, a method called discontinuous reception (DRX) is employed whereby the UE and base station negotiate the times or periods in which transmissions are to occur. This allows the UE to turn off or suspend usage of its radio circuits when no transmission is expected.

Figure 12:
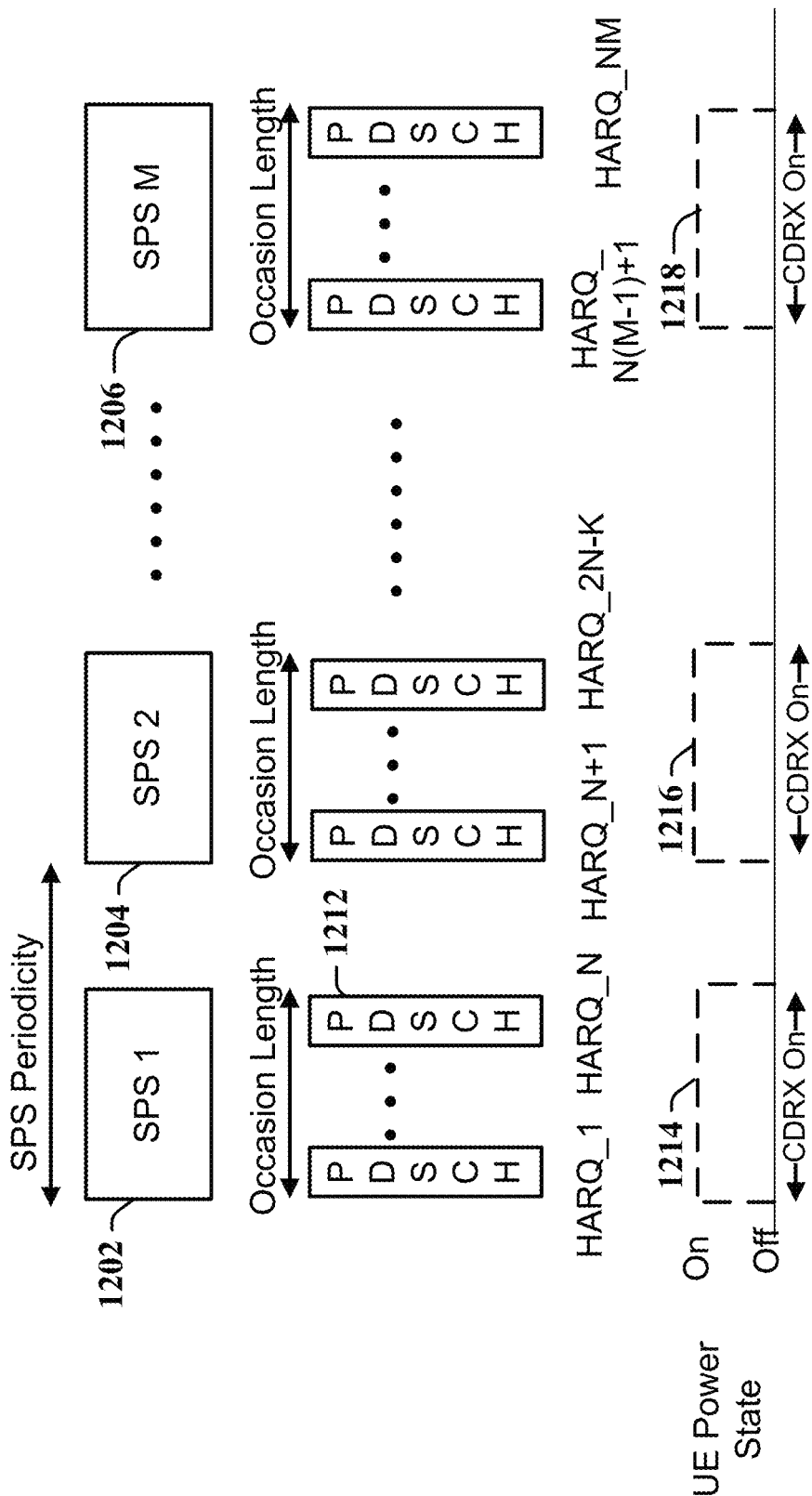
FIG. 12 illustrates one example of how a UE may configure its power state for reception of SPS occasions.

FIG. 12 illustrates one example of how a UE may configure its power state for reception of SPS occasions. In this example, the UE may be aware of the maximum number of PDSCHs within each SPS occasion 1202, 1204, and 1206, but does not receive information about which PDSCH 1212 are being transmitted or not. That is, it is possible for some PDSCH 1212 may be skipped within some SPS occasions, but the UE is not aware of such information. Consequently, in this example the UE operates in a connected mode DRX (CDRX) 1214, 1216, and 1218, in which it stays powered ON during the entire occasion length in order to receive all PDSCH possible within each SPS occasion.

Figure 13:
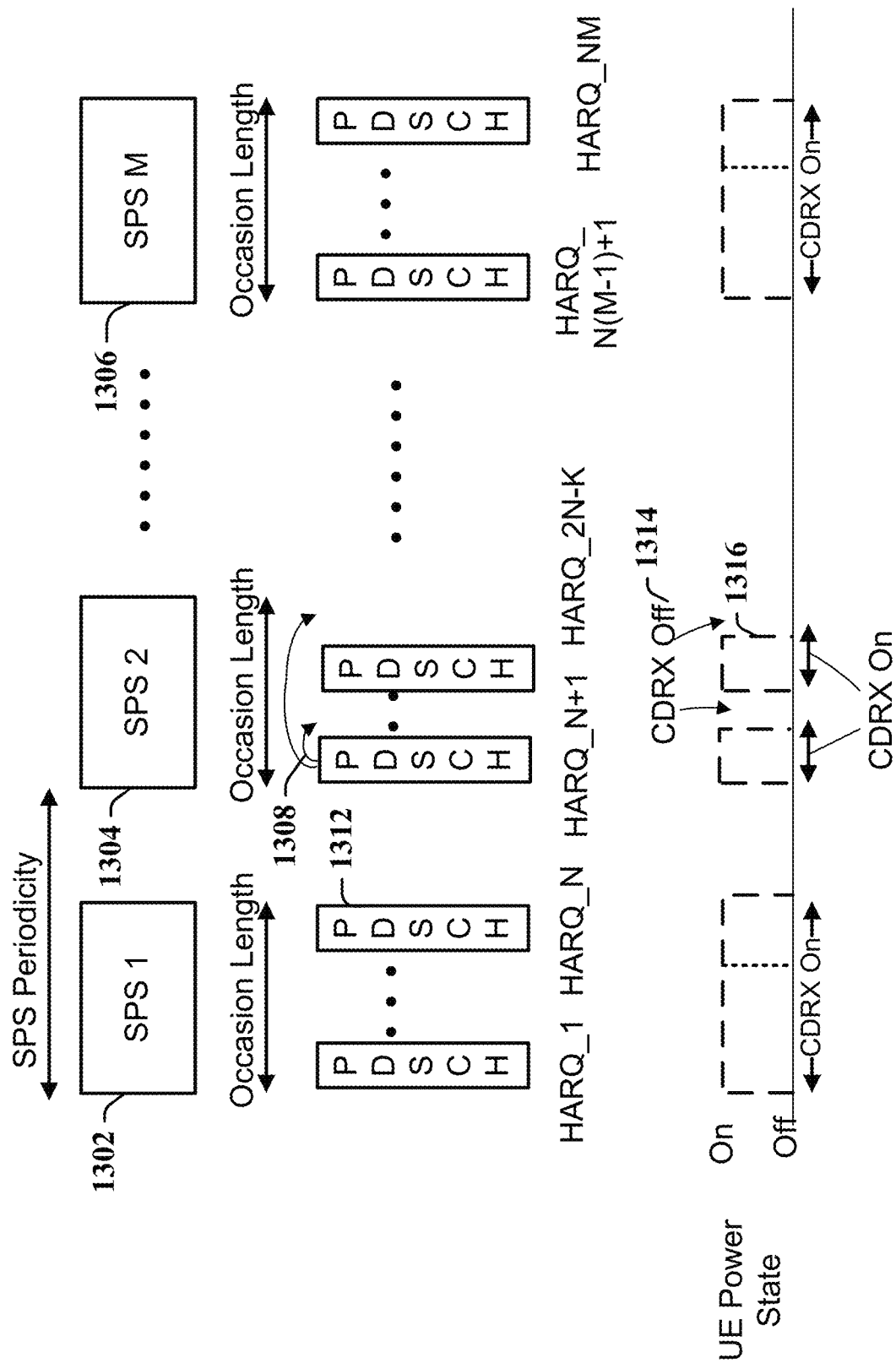
FIG. 13 illustrates another example of how a UE may configure its power state for reception of SPS occasions.

FIG. 13 illustrates another example of how a UE may configure its power state for reception of SPS occasions. In this example, the UE may be aware of the maximum number of PDSCHs within each SPS occasion 1302, 1304, and 1306, and also receives information about which PDSCH 1312 are being transmitted or not. That is, it is possible for some PDSCH 1312 may be skipped within some SPS occasions, and the UE is made aware of such information. Therefore, the UE is aware of the opportunities to go sleep or the location of transmitted PDSCH. Consequently, the active time of reception for the UE can be reduced.

In one example, the base station may provide information about which PDSCH can be skipped within a PDCCH/MAC CE on the any of the PDSCHs before the empty slot (i.e., before the PDSCH that is empty and can be skipped). The PDSCH could be with the same SPS occasion as the empty slot or earlier SPS occasions. If not intended to be used immediately, a timing offset may be signaled within the PDCCH signal/MAC CE. Thus, providing a UE with such information to skip a PDSCH will help the UE go to sleep quicker, therefore, saving more power.

In this example, within an SPS occasion 1304, the base station has provided the UE with an indication 1308 that some of the PDSCH in that occasion 1304 can be skipped or are not being transmitted. Therefore, the UE may use this information to power off 1314 during the times when one or more PDSCHs can be skipped.

Figure 14:
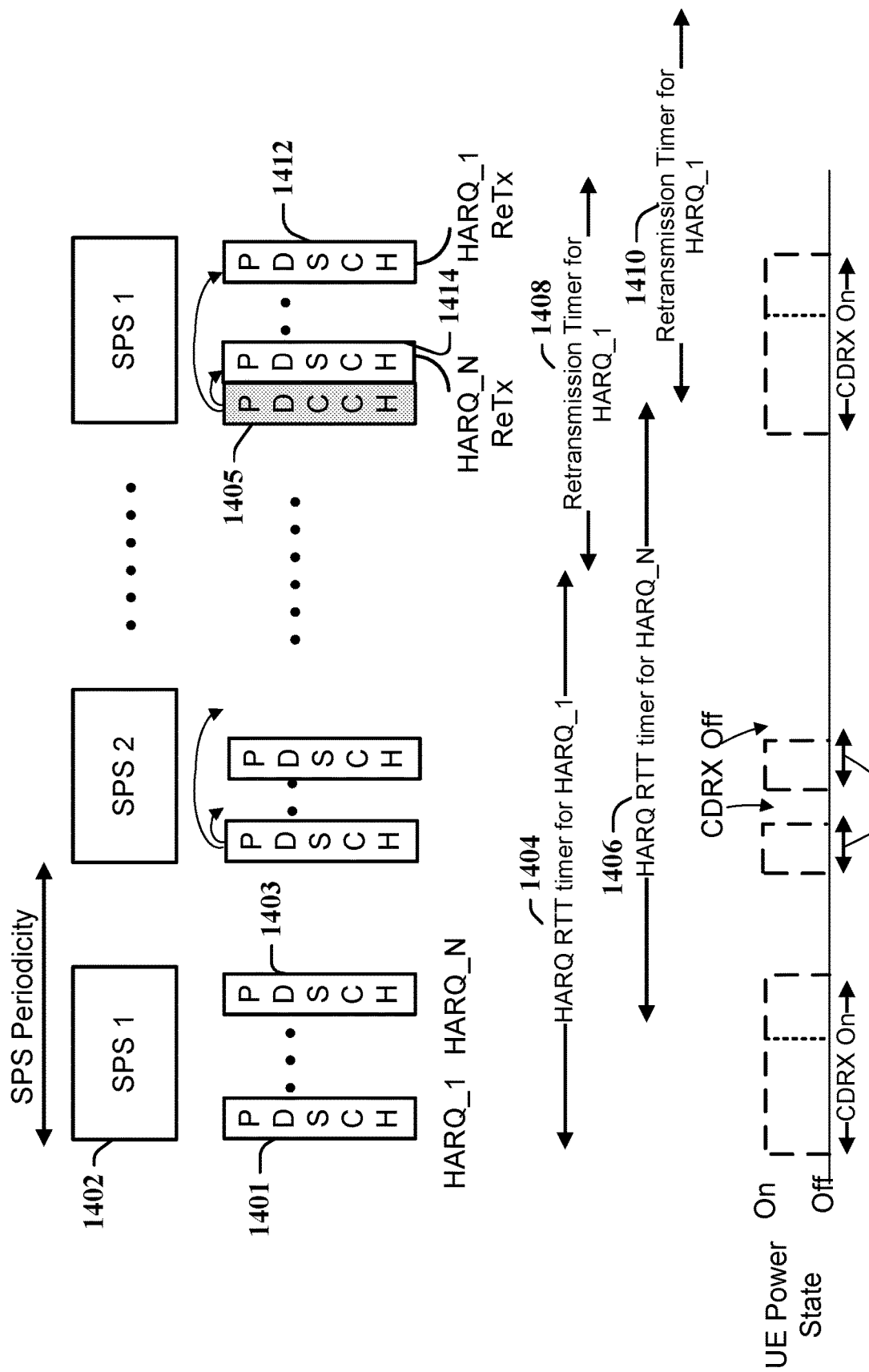
FIG. 14 illustrates examples of how individual PDSCH retransmissions may be accomplished in the context of multi-slot SPS occasions.

FIG. 14 illustrates examples of how individual PDSCH retransmissions may be accomplished in the context of multi-slot SPS occasions. For each PDSCH 1401 in an SPS occasion 1402, a HARQ round trip timer (RTT) 1404 and 1406 may be maintained. Upon expiration of such HARQ RRT, if retransmission is necessary, then the base station may send a PDCCH 1405 that includes information about PDSCH retransmission. In this example, a HARQ RTT timer 1404 and 1406 is maintained for each HARQ process, except for broadcast processes. A minimum duration (0 to 56 milliseconds) may be defined for the HARQ RTT timer, after a downlink retransmission is expected. A Retransmission Timer 1408 and 1410 serves to track a maximum duration (e.g., 0 to 128 slots) before a downlink retransmission is received.

Here, the PDCCH 1405 may be sent by the base station to indicate retransmission of certain PDSCH. For individual Transport Block transmissions, since the HARQ RTT timer and retransmission timer are per HARQ process, the order of retransmissions of other HARQ processes does not impact the length of these timers. For instance, a first PDSCH 1401 is retransmitted 1412 after a later transmitted second PDSCH 1403 is retransmitted 1414.

Figure 15:
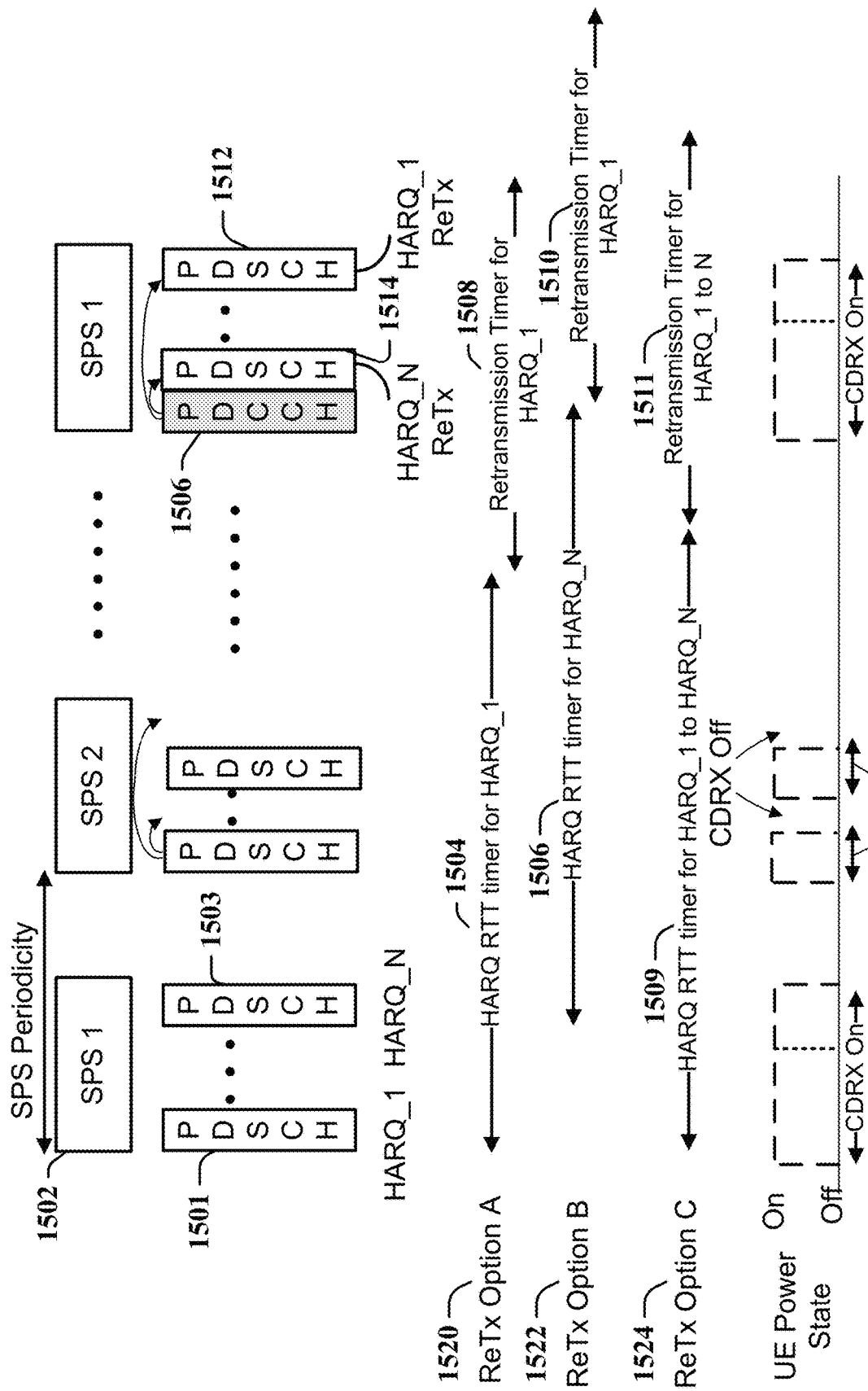
FIG. 15 illustrates examples of how group PDSCH retransmissions may be accomplished in the context of multi-slot SPS occasions.

FIG. 15 illustrates examples of how group PDSCH retransmissions may be accomplished in the context of multi-slot SPS occasions. When a group of PDSCHs (e.g., group of TBs/CBGs) within an SPS occasion need to be retransmitted, various options are available for determining an HARQ RTT timer and a retransmission timer.

According to a first option A 1520, for a group of PDSCHs that need retransmission, an HARQ RTT timer 1504 and a retransmission timer 1508 for a first transmitted PDSCH 1501 in an SPS occasion 1502 are used. That is, the first transmitted PDSCH 1501 is used as a reference for the group of PDSCHs for purposes of retransmissions.

According to a second option B 1522, for a group of PDSCHs that may need retransmission, an HARQ RTT timer 1506 and a retransmission timer 1510 for a last transmitted PDSCH 1503 (or the maximum number of PDSCHs) in a SPS occasion 1502 are used. That is, the last transmitted PDSCH 1503 is used as a reference for the group of PDSCHs for purposes of retransmission.

According to a third option C 1524, for a group of PDSCHs that may need retransmission, a mixture of HARQ RTT timers 1509 and retransmission timers 1511 for different PDSCHs in an SPS occasion 1502 may be used. For example, a HARQ RTT timer of a first PDSCH 1501 and a retransmission timer for a last PDSCH 1503 in the SPS occasion 1502 may be used to trigger retransmissions.

Figure 16:
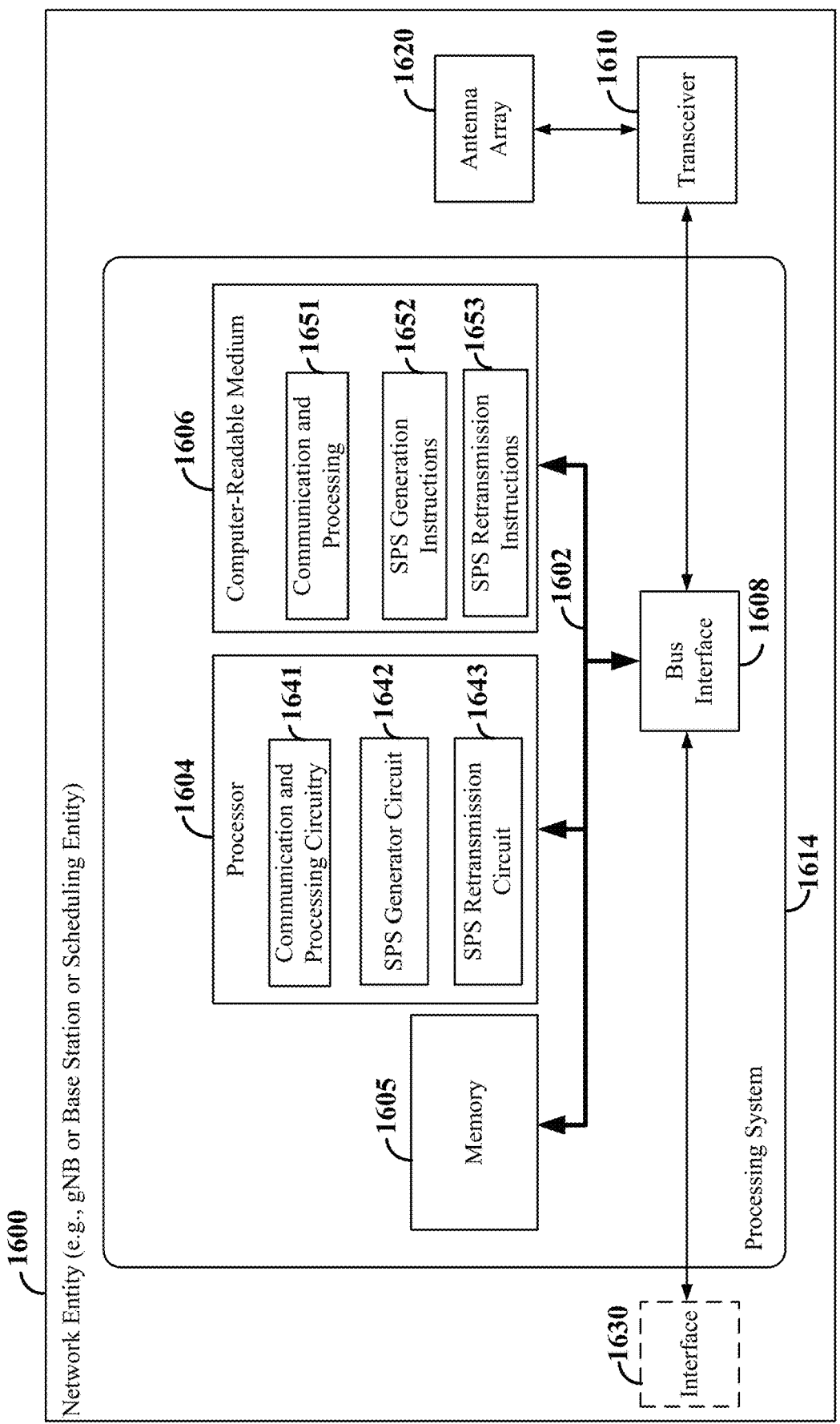
FIG. 16 is a block diagram conceptually illustrating an example of a hardware implementation for a network node, base station, or scheduling configured to communicate using multi-slot SPS occasions.

FIG. 16 is a block diagram conceptually illustrating an example of a hardware implementation for a network node, base station, or scheduling entity 1600 employing a processing system 1614 according to some aspects of the disclosure. In accordance with various aspects of the disclosure, an element, or any portion of an element, or any combination of elements may be implemented with a processing system 1614 that includes one or more processors 1604. In some implementations, the network entity 1600 may correspond to any of the BSs (e.g., gNBs, eNBs, etc.) or scheduling entities shown in FIG. 1 or 2.

The network entity 1600 may be implemented with a processing system 1614 that includes one or more processors 1604. Examples of processors 1604 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the network entity 1600 may be configured to perform any one or more of the functions described herein. That is, the processor 1604, as utilized in network entity 1600, may be used to implement any one or more of the processes and procedures described herein.

In this example, the processing system 1614 may be implemented with a bus architecture, represented generally by the bus 1602. The bus 1602 may include any number of interconnecting buses and bridges depending on the specific application of the processing system 1614 and the overall design constraints. The bus 1602 communicatively couples together various circuits including one or more processors (represented generally by the processor 1604), a memory 1605, and computer-readable media (represented generally by the computer-readable medium 1606). The bus 1602 may also link various other circuits such as timing sources, peripherals, voltage regulators, and power management circuits, which are well known in the art, and therefore, will not be described any further. A bus interface 1608 provides an interface between the bus 1602 and a transceiver 1610 and between the bus 1602 and an interface 1630. The transceiver 1610 provides a communication interface or means for communicating with various other apparatus over a wireless transmission medium. In some examples, the wireless communication device may include two or more transceivers 1610, each configured to communicate with a respective network type (e.g., terrestrial or non-terrestrial). At least one interface 1630 (e.g., a network interface and/or a user interface) provides a communication interface or means of communicating with various other apparatus and devices (e.g., other devices housed within the same apparatus as the network entity 1600 or an external apparatus) over an internal bus or external transmission medium, such as an Ethernet cable.

The processor 1604 is responsible for managing the bus 1602 and general processing, including the execution of software stored on the computer-readable medium 1606. The software, when executed by the processor 1604, causes the processing system 1614 to perform the various functions described below for any particular apparatus. The computer-readable medium 1606 and the memory 1605 may also be used for storing data that is manipulated by the processor 1604 when executing software.

One or more processors 1604 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 1606.

The computer-readable medium 1606 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 1606 may reside in the processing system 1614, external to the processing system 1614, or distributed across multiple entities including the processing system 1614. The computer-readable medium 1606 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

The network entity 1600 may be configured to perform any one or more of the operations described herein (e.g., as described above in conjunction with FIGS. 4-15. In some aspects of the disclosure, the processor 1604, as utilized in the network entity 1600, may include circuitry configured for various functions.

The processor 1604 may be configured to schedule multi-slot semi-persistent occasions for the downlink transmission on a plurality of downlink beams to a UE. The processor 1604 may include communication and processing circuitry 1641. The communication and processing circuitry 1641 may include one or more hardware components that provide the physical structure that performs various processes related to wireless communication (e.g., signal reception and/or signal transmission) as described herein. The communication and processing circuitry 1641 may further include one or more hardware components that provide the physical structure that performs various processes related to signal processing (e.g., processing a received signal and/or processing a signal for transmission) as described herein. In some examples, the communication and processing circuitry 1641 may include two or more transmit/receive chains. The communication and processing circuitry 1641 may further be configured to execute communication and processing software 1651 included on the computer-readable medium 1606 to implement one or more functions described herein.

In some other examples, the communication and processing circuitry 1641 may be configured to communicate higher layer information such as RRC configuration information to a UE. For example, the communication and processing circuitry 1641 may communicate RRC parameters to UEs including the gamma or scaling value discussed before.

The processor 1604 may further include SPS generator circuitry 1642 configured to schedule multi-slot SPS occasions for downlink transmissions to an UE, The SPS generator circuitry 1642 may further be configured to execute SPS generation software 1652 included on the computer-readable medium 1606 to implement one or more functions described herein.

In some further examples, the processor 1604 may further include SPS retransmission circuitry 1643, which is configured to retransmit data using multi-slot SPS occasions to a UE. The decoding circuitry 1643 may further be configured to execute SPS retransmission software 1653 included on the computer-readable medium 1606 to implement one or more functions described herein.

Figure 17:
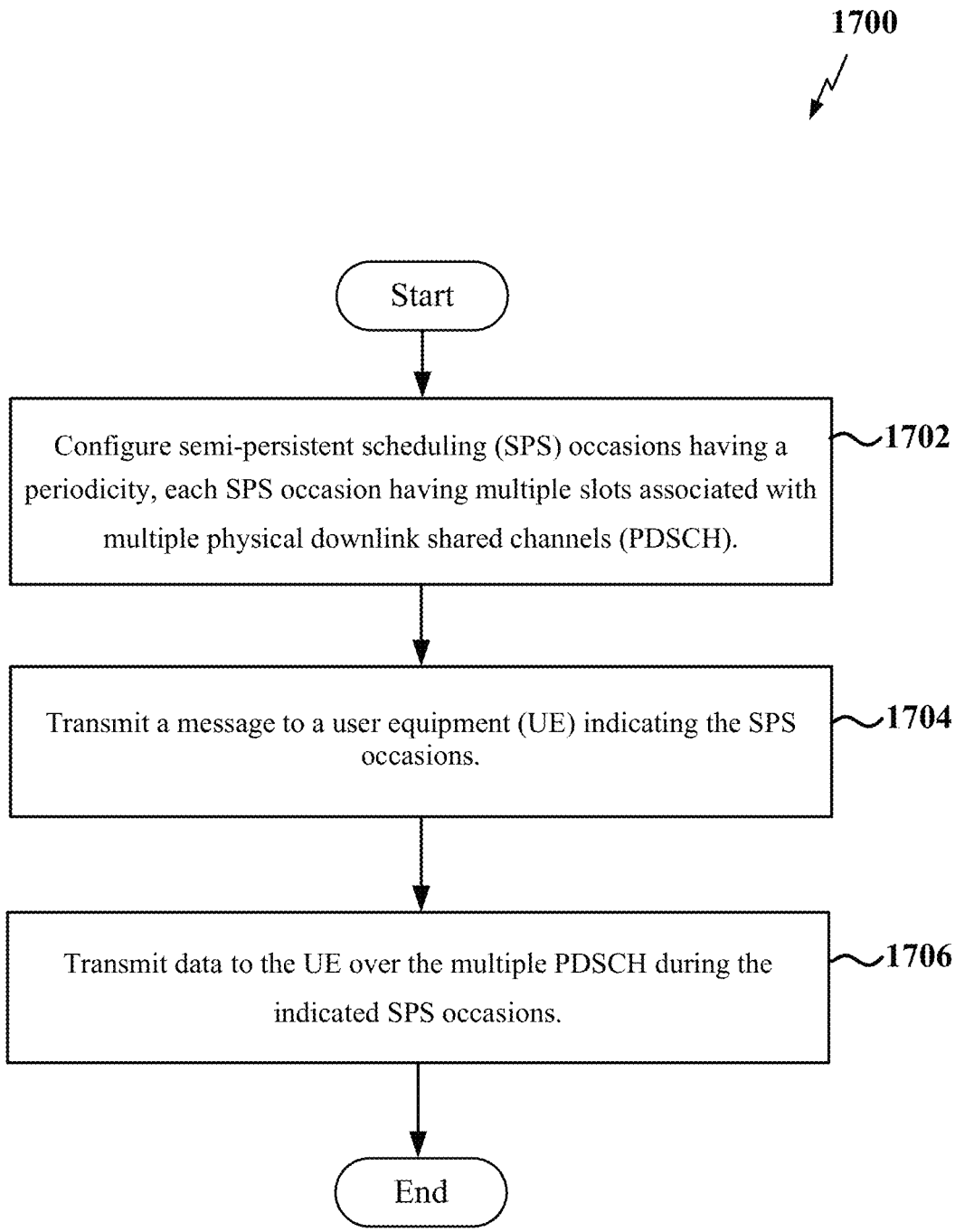
FIG. 17 is a flow chart illustrating an example wireless communication method using multi-slot SPS occasions.

FIG. 17 is a flow chart illustrating an example wireless communication method 1700 using multi-slot SPS occasions. As described herein, some or all illustrated features may be omitted in a particular implementation within the scope of the present disclosure, and some illustrated features may not be required for implementation of all examples. In some examples, the method 1700 may be carried out by the network entity 1600 (e.g., a gNB or base station) illustrated in FIG. 16. In some examples, the method 1700 may be carried out by any suitable apparatus or means for carrying out the functions or algorithm described below.

At block 1702, the method 1700 includes defining or configuring semi-persistent scheduling (SPS) occasions having a periodicity, each SPS occasion having multiple slots associated with multiple physical downlink shared channels (PDSCH).

At block 1704, the method 1700 may further include transmitting a message to a user equipment (UE) indicating the SPS occasions.

At block 1706, the method 1700 may further include transmitting data to the UE over the multiple PDSCH during the indicated SPS occasions. Each PDSCH in an SPS occasion may carry a variable number of data bits.

In one aspect, as illustrated in FIG. 5, the number of PDSCH for an SPS occasion may be dynamically adjusted, wherein different number of PDSCH are used in two sequential SPS occasions. For instance, the number of PDSCH is increased or decreased based on at least one of: (a) traffic received at the UE, or (b) an amount of data the base station intends to send.

In one feature, a maximum number of PDSCH allowed for the SPS occasions may be sent to the UE using a radio resource control (RRC) signaling, medium access control (MAC) signaling, or Layer1 signaling.

According to another feature, a first SPS occasion includes a first PDSCH and a second PDSCH, where the first PDSCH and second PDSCH use at least one of: different encoding schemes or different modulation schemes. This may permit different types of traffic within PDSCHs of the same occasion to be modulated and/or encoded differently (e.g., to optimize deliver).

In various implementations, the UE may send acknowledgments to the base station to indicate which PDSCH or slots were received or not received. For instance, as illustrated in FIG. 6, the base station may receive: (a) an individual acknowledgment from the UE for PDSCH in an SPS occasion, (b) a block acknowledgment from the UE for all PDSCH in an SPS occasion, or (c) a joint acknowledgment from the UE for all PDSCH in multiple SPS occasions.

Upon receipt of such acknowledgments, the base station may choose to retransmit some PDSCH or slots. As illustrated in FIG. 7, one or more of the SPS occasions may be configured by the base station to include PDSCH retransmission information within a physical downlink control channel (PDCCH), the PDSCH retransmission information specifying one or more PDSCHs within one or more SPS occasions which were previously transmitted. For instance, the base station may transmit a physical downlink control channel (PDCCH) separate from the SPS occasions, the PDCCH providing PDSCH retransmission information to the UE and specifying one or more SPS occasions in which previously transmitted PDSCH are to be retransmitted. Subsequently, the base station may transmit the specified or identified PDSCH.

As illustrated in FIGS. 8 and 9, acknowledgments from the UE may be referenced by one or more identifiers (e.g., HARQ ID) that map to one or more previously transmitted slots. In one example, each of the one or more identifiers is a function of at least the periodicity and a maximum number of PDSCH in an SPS occasion. These one or more identifiers may be computed using Equation 2, above. At the base station, the one or more identifiers are mapped or converted to slots (or PDSCH) to ascertain which PDSCH (or slot) should be retransmitted.

According to one example, illustrated in FIG. 10, the base station may transmit data to the UE over the multiple PDSCH during the indicated SPS occasions using: (a) a different downlink beam to transmit each PDSCH within an SPS occasion, (b) a different downlink beam to transmit the PDSCH in different SPS occasions, or (c) one downlink beam to transmit all PDSCH within in all SPS occasions. Similarly, as illustrated in FIG. 11, acknowledgments from the UE to the base station may be sent using the same uplink beam for all ACKs associated with all SPS occasions, or a different uplink beams for ACKs associated with different SPS occasions.

In order to reduce power consumption at the UE, the base station may send an indication to the UE specifying when one or more PDSCH within an SPS occasion are empty or will not be transmitted. This allows the UE to turn off, power down, or enter a power savings mode (e.g., shut off one or more components, radio chain, etc.) when one or more PDSCH are expected to be empty or not transmitted.

The various aspects described in FIGS. 1-19 may be implemented by a base station and UE that communicate using a 5G network.

Figure 18:
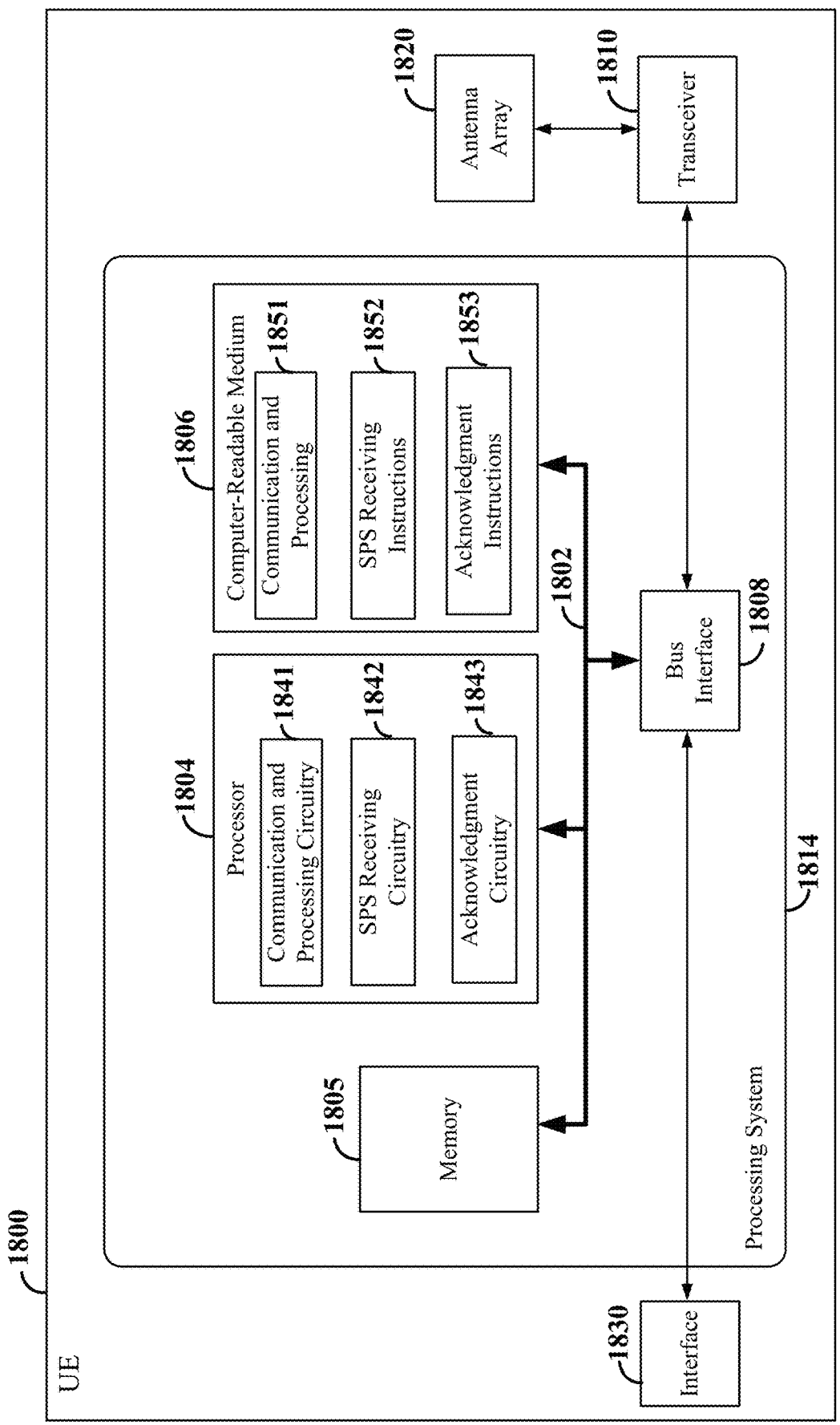
FIG. 18 is a block diagram conceptually illustrating an example of a hardware implementation for a user equipment (UE) configured to communicate using multi-slot SPS occasions.

FIG. 18 is a block diagram conceptually illustrating an example of a hardware implementation for a user equipment (UE) employing a processing system 1814 according to some aspects of the disclosure. In accordance with various aspects of the disclosure, an element, or any portion of an element, or any combination of elements may be implemented with a processing system 1814 that includes one or more processors 1804. In some implementations, the UE 1800 may correspond to any of the UEs or scheduled entities shown in any of FIGS. 1 and 2 discussed previously.

The UE 1800 may be implemented with a processing system 1814 that includes one or more processors 1804. Examples of processors 1804 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the UE 1800 may be configured to perform any one or more of the functions described herein. That is, the processor 1804, as utilized in a UE 1800, may be used to implement any one or more of the processes and procedures described below.

In this example, the processing system 1814 may be implemented with a bus architecture, represented generally by the bus 1802. The bus 1802 may include any number of interconnecting buses and bridges depending on the specific application of the processing system 1814 and the overall design constraints. The bus 1802 communicatively couples together various circuits including one or more processors (represented generally by the processor 1804), a memory 1805, and computer-readable media (represented generally by the computer-readable medium 1806). The bus 1802 may also link various other circuits such as timing sources, peripherals, voltage regulators, and power management circuits, which are well known in the art, and therefore, will not be described any further. A bus interface 1808 provides an interface between the bus 1802 and a transceiver 1810 and between the bus 1802 and an interface 1830. The transceiver 1810 provides a communication interface or means for communicating with various other apparatus over a wireless transmission medium. In some examples, the wireless communication device may include two or more transceivers 1810, each configured to communicate with a respective network type (e.g., terrestrial or non-terrestrial). At least one interface 1830 (e.g., a network interface and/or a user interface) provides a communication interface or means of communicating with various other apparatus and devices (e.g., other devices housed within the same apparatus as the UE 1800 or an external apparatus) over an internal bus or via external transmission medium, such as an Ethernet cable.

The processor 1804 is responsible for managing the bus 1802 and general processing, including the execution of software stored on the computer-readable medium 1806. The software, when executed by the processor 1804, causes the processing system 1814 to perform the various functions described below for any particular apparatus. The computer-readable medium 1806 and the memory 1805 may also be used for storing data that is manipulated by the processor 1804 when executing software.

One or more processors 1804 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 1806.

The computer-readable medium 1806 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 1806 may reside in the processing system 1814, external to the processing system 1814, or distributed across multiple entities including the processing system 1814. The computer-readable medium 1806 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

The UE 1800 may be configured to perform any one or more of the operations described herein (e.g., as described above in conjunction with FIGS. 1-15. In some aspects of the disclosure, the processor 1804, as utilized in the UE 1800, may include circuitry configured for various functions.

In one aspect, the processor 1804 may include a communication and processing circuitry 1841. The communication and processing circuitry 1841 may include one or more hardware components that provide the physical structure that performs various processes related to wireless communication (e.g., signal reception and/or signal transmission) as described herein. The communication and processing circuitry 1841 may further include one or more hardware components that provide the physical structure that performs various processes related to signal processing (e.g., processing a received signal and/or processing a signal for transmission) as described herein. In some examples, the communication and processing circuitry 1841 may include two or more transmit/receive chains. The communication and processing circuitry 1841 may further be configured to execute communication and processing software 1851 included on the computer-readable medium 1806 to implement one or more functions described herein.

The processor 1804 also includes SPS receiving circuitry 1842 configured to receive data over SPS occasions and channels therein, such as was illustrated in any of FIGS. 4-15. The SPS receiving circuitry 1842 may further be configured to execute SPS receiving software 1852 included on the computer-readable medium 1806 to implement one or more functions described herein.

The processor 1804 also includes acknowledgement circuitry 1843 configured to acknowledge transmissions over the SPS occasions. The acknowledgement circuitry 1843 may include functionality for sending acknowledgements according to any of the examples of FIGS. 4-15, for example. The acknowledgement circuitry 1843 may further be configured to execute acknowledgement software 1853 included on the computer-readable medium 1806 to implement one or more functions described herein.

Figure 19:
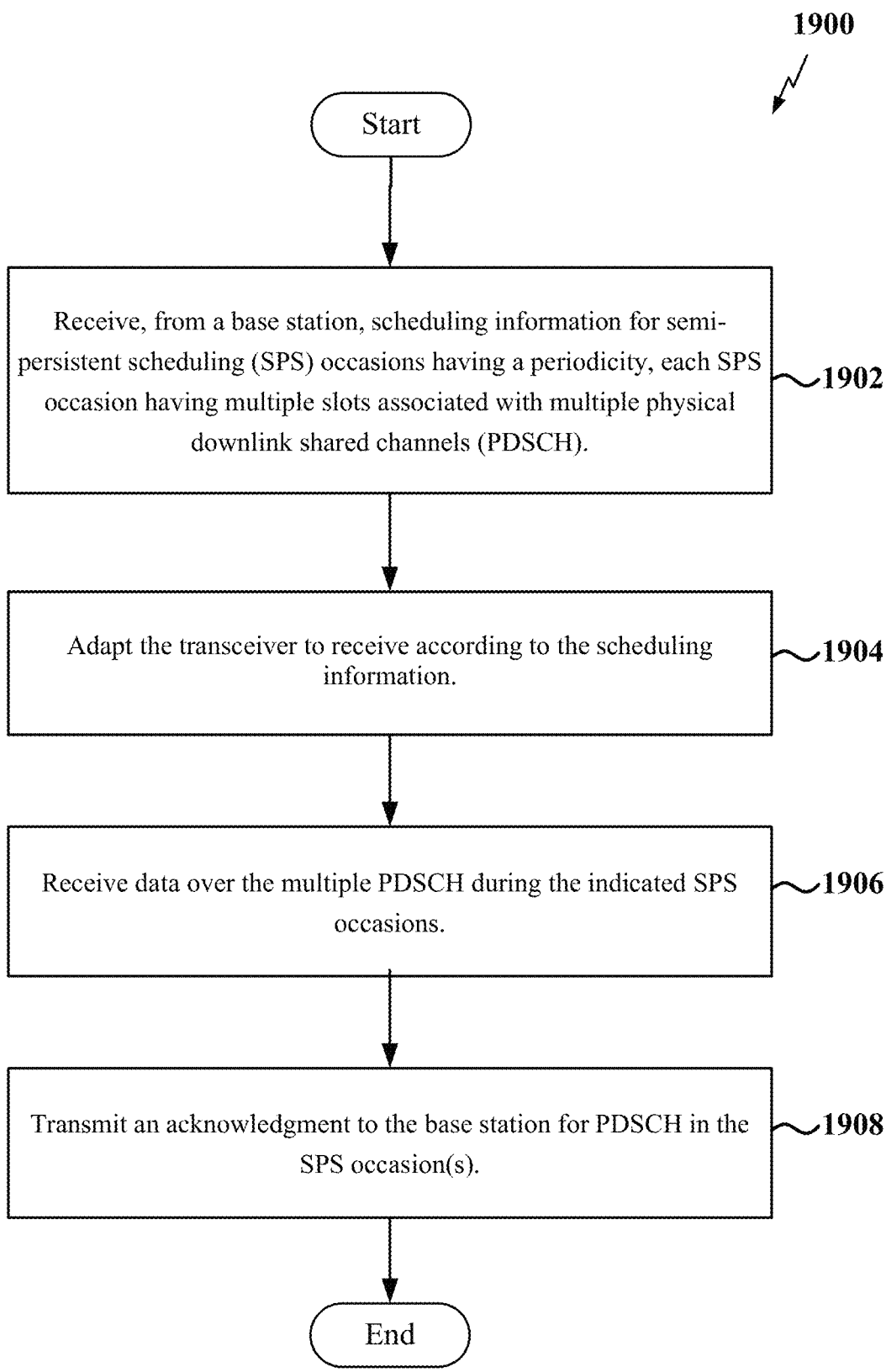
FIG. 19 is a flow chart illustrating an example wireless communication method implemented by a UE using multi-slot SPS occasions.

FIG. 19 is a flow chart illustrating an example wireless communication method 1900 implemented by a UE using multi-slot SPS occasions. As described herein, some or all illustrated features may be omitted in a particular implementation within the scope of the present disclosure, and some illustrated features may not be required for implementation of all examples. In some examples, the method 1900 may be carried out by the UE 1800 illustrated in FIG. 18. In some examples, the method 1900 may be carried out by any suitable apparatus or means for carrying out the functions or algorithm described below.

At block 1902, the UE may receive, from a base station, scheduling information for semi-persistent scheduling (SPS) occasions having a periodicity, each SPS occasion having multiple slots associated with multiple physical downlink shared channels (PDSCH). In an aspect, the processes of block 1902 may implemented by the processor 1804, and SPS receiving circuitry 1842, and may further include aspects of communication and processing circuitry 1841, and/or transceiver 1810, or equivalents thereof.

At block 1904, the UE may adapt the transceiver to receive according to the scheduling information. In an aspect, the processes of block 1904 may implemented by the processor 1804, and SPS receiving circuitry 1842, and may further include aspects of communication and processing circuitry 1841, and/or transceiver 1810, or equivalents thereof.

At block 1906, the UE may receive data over the multiple PDSCH during the indicated SPS occasions. In an aspect, the processes of block 1906 may implemented by the processor 1804, and SPS receiving circuitry 1842, and may further include aspects of communication and processing circuitry 1841, and/or transceiver 1810, or equivalents thereof.

At block 1908, the UE may transmit an acknowledgment to the base station for PDSCH in the SPS occasion(s). In an aspect, the processes of block 1908 may implemented by the processor 1804, and acknowledgment circuitry 1843, and may further include aspects of communication and processing circuitry 1841, and/or transceiver 1810, or equivalents thereof. In various examples, illustrated in FIG. 6, (a) an individual acknowledgment may be transmitted to the base station for PDSCH in an SPS occasion, (b) a block acknowledgment may be transmitted to the base station for all PDSCH in an SPS occasion; or (c) a joint acknowledgment may be transmitted to the base station for all PDSCH in multiple SPS occasions.

According to one aspect, illustrated in FIG. 5, the UE may receive additional information from the base station that adjusts the number of PDSCH for an SPS occasion, wherein different number of PDSCH are used in two sequential SPS occasions.

In another example, the UE may send acknowledgments, in response to received data over the multiple PDSCH, indicating which PDSCH were correctly or incorrectly received. The acknowledgments may include one or more identifiers that map to one or more previously transmitted slots, and each of the one or more identifiers is a function of at least the periodicity and a maximum number of PDSCH in an SPS occasion.

In some implementations, the UE may also receive one or more of the SPS occasions with PDSCH retransmission information within a physical downlink control channel (PDCCH), the PDSCH retransmission information specifying one or more PDSCHs within one or more SPS occasions which were previously transmitted.

In another example, the UE may receive a physical downlink control channel (PDCCH) separate from the SPS occasions, the PDCCH providing PDSCH retransmission information to the UE and specifying one or more SPS occasions in which previously transmitted PDSCH are to be retransmitted.

In one implementation, the UE may seek to conserve power during SPS occasions. To do this, the UE may receive an indication from the base station specifying when one or more PDSCH within an SPS occasion are empty or will not be transmitted. The UE may then switch to or enter a power savings mode during time periods when the one or more PDSCH within the SPS occasion are indicated to be empty or will not be transmitted. For instance, the UE may turn off its receiver or transceiver chain/circuit when no PDSCH is expected (or an empty PDSCH is expected) within an SPS occasion.

Of further note, the present disclosure may include the following further aspects of the present disclosure.

Aspect 1: A method for communication at a base station, comprising: configuring semi-persistent scheduling (SPS) occasions having a periodicity, each SPS occasion having multiple slots associated with multiple physical downlink shared channels (PDSCH); transmitting a message to a user equipment (UE) indicating the SPS occasions; and transmitting data to the UE over the multiple PDSCH during the indicated SPS occasions.

Aspect 2: The method of aspects 1, further comprising: dynamically adjusting the number of PDSCH for an SPS occasion, wherein different number of PDSCH are used in two sequential SPS occasions.

Aspect 3: The method of aspects 1 or 2, wherein the number of PDSCH is increased or decreased based on at least one of: (a) traffic received at the UE, or (b) an amount of data the base station intends to send.

Aspect 4: The method of any of aspects 1 through 3, further comprising: sending a maximum number of PDSCH allowed for the SPS occasions to the UE using a radio resource control (RRC) signaling, medium access control (MAC) signaling, or Layer1 signaling.

Aspect 5: The method of any of aspects 1 through 4, wherein a first SPS occasion includes a first PDSCH and a second PDSCH, where the first PDSCH and second PDSCH use at least one of: different encoding schemes or different modulation schemes.

Aspect 6: The method of any of aspects 1 through 5, wherein each PDSCH in an SPS occasion carries a variable number of data bits.

Aspect 7: The method of any of aspects 1 through 6, further comprising: receiving an individual acknowledgment from the UE for PDSCH in an SPS occasion; or receiving a block acknowledgment from the UE for all PDSCH in an SPS occasion; or receiving a joint acknowledgment from the UE for all PDSCH in multiple SPS occasions.

Aspect 8: The method of any of aspects 1 through 7, further comprising: configuring one or more of the SPS occasions to include PDSCH retransmission information within a physical downlink control channel (PDCCH), the PDSCH retransmission information specifying one or more PDSCHs within one or more SPS occasions which were previously transmitted.

Aspect 9: The method of any of aspects 1 through 8, further comprising: transmitting a physical downlink control channel (PDCCH) separate from the SPS occasions, the PDCCH providing PDSCH retransmission information to the UE and specifying one or more SPS occasions in which previously transmitted PDSCH are to be retransmitted.

Aspect 10: The method of any of aspects 1 through 9, wherein acknowledgments from the UE are referenced by one or more identifiers that map to one or more previously transmitted slots.

Aspect 11: The method of any of aspects 1 through 9, wherein each of the one or more identifiers is a function of at least the periodicity and a maximum number of PDSCH in an SPS occasion.

Aspect 12: The method of any of aspects 1 through 11, wherein transmitting data to the UE over the multiple PDSCH during the indicated SPS occasions includes: using a different downlink beam to transmit each PDSCH within an SPS occasion; or using a different downlink beam to transmit the PDSCH in different SPS occasions; or using one downlink beam to transmit all PDSCH within in all SPS occasions.

Aspect 13: The method of any of aspects 1 through 12, further comprising: sending an indication to the UE specifying when one or more PDSCH within an SPS occasion are empty or will not be transmitted.

Aspect 14: The method of any of aspects 1 through 13, wherein the base station and UE communicate using a 5G network.

Aspect 15: A method for communication at a user equipment device, comprising: receiving, from a base station, scheduling information for semi-persistent scheduling (SPS) occasions having a periodicity, each SPS occasion having multiple slots associated with multiple physical downlink shared channels (PDSCH); adapting the transceiver to receive according to the scheduling information; and receiving data over the multiple PDSCH during the indicated SPS occasions.

Aspect 16: The method of aspect 15, further comprising: receive additional information from the base station that adjusts the number of PDSCH for an SPS occasion, wherein different number of PDSCH are used in two sequential SPS occasions.

Aspect 17: The method of any of aspects 15 through 16, further comprising: transmitting an individual acknowledgment to the base station for PDSCH in an SPS occasion; or transmitting a block acknowledgment to the base station for all PDSCH in an SPS occasion; or transmitting a joint acknowledgment to the base station for all PDSCH in multiple SPS occasions.

Aspect 18: The method of any of aspects 15 through 17, further comprising: sending acknowledgments, in response to received data over the multiple PDSCH, indicating which PDSCH were correctly or incorrectly received, the acknowledgments including one or more identifiers that map to one or more previously transmitted slots, and each of the one or more identifiers is a function of at least the periodicity and a maximum number of PDSCH in an SPS occasion.

Aspect 19: The method of any of aspects 15 through 18, further comprising: receiving one or more of the SPS occasions with PDSCH retransmission information within a physical downlink control channel (PDCCH), the PDSCH retransmission information specifying one or more PDSCHs within one or more SPS occasions which were previously transmitted.

Aspect 20: The method of any of aspects 15 through 18, further comprising: receiving a physical downlink control channel (PDCCH) separate from the SPS occasions, the PDCCH providing PDSCH retransmission information to the UE and specifying one or more SPS occasions in which previously transmitted PDSCH are to be retransmitted.

Aspect 21: The method of any of aspects 15 through 20, further comprising: receiving an indication from the base station specifying when one or more PDSCH within an SPS occasion are empty or will not be transmitted, and switching the UE to a power savings mode during time periods when the one or more PDSCH within the SPS occasion are indicated to be empty or will not be transmitted.

Several aspects of a wireless communication network have been presented with reference to an example implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure. As used herein, the term "determining" may encompass a wide variety of actions. For example, "determining" may include calculating, computing, processing, deriving, investigating, looking up (e.g., looking up in a table, a database or another data structure), ascertaining, resolving, selecting, choosing, establishing, receiving (e.g., receiving information), accessing (e.g., accessing data in a memory), and the like.

One or more of the components, steps, features and/or functions illustrated in FIGS. 1-19 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in any of FIGS. 1-19 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of example processes. Based upon design preferences, it is understood that the specific order or hierarchy of steps in the methods may be rearranged. The accompanying method claims present elements of the various steps in a sample order and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b, and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A base station, comprising:
    a wireless transceiver; and
    a processor communicatively coupled to the wireless transceiver, wherein the processor is configured to:
        configure semi-persistent scheduling (SPS) occasions having a periodicity, each of the SPS occasions having a plurality of physical downlink shared channels (PDSCHs), each PDSCH of the plurality of PDSCHs spanning one or more slots;
        transmit a message to a user equipment (UE) indicating the SPS occasions; and
        transmit data to the UE over the plurality of PDSCHs during the SPS occasions,
        wherein a number of PDSCHs of a given SPS occasion is increased or decreased in the time domain based on at least one of: traffic received at the UE, or an amount of data to be sent to the UE, and each of the plurality of PDSCHs in the given SPS occasion carries a variable number of data bits, and wherein a first SPS occasion of the SPS occasions includes a first PDSCH and a second PDSCH, and the first PDSCH and the second PDSCH use at least one of: different encoding schemes or different modulation schemes;
        receive an individual acknowledgment from the UE for a PDSCH in an SPS occasion; or
        receive a block acknowledgment from the UE for all PDSCH in the SPS occasion; or
        receive a joint acknowledgment from the UE for all PDSCH in multiple SPS occasions;
        wherein acknowledgments from the UE are referenced by one or more identifiers that map to one or more previously transmitted slots.

2. The base station of claim 1, wherein the processor is further configured to:
    dynamically adjust the number of the plurality of PDSCHs for an SPS occasion, wherein a different number of PDSCHs are used in two sequential SPS occasions.

3. The base station of claim 1, wherein the processor is further configured to:
    configure one or more of the SPS occasions to include PDSCH retransmission information within a physical downlink control channel (PDCCH), the PDSCH retransmission information specifying one or more PDSCHs within the one or more of the SPS occasions.

4. The base station of claim 1, wherein the processor is further configured to:
    transmit a physical downlink control channel (PDCCH) separate from the SPS occasions, the PDCCH providing PDSCH retransmission information to the UE and specifying one or more of the SPS occasions in which PDSCHs are to be retransmitted.

5. A method for communication at a base station, comprising:
    configuring semi-persistent scheduling (SPS) occasions having a periodicity, each of the SPS occasions having a plurality of physical downlink shared channels (PDSCHs), each PDSCH of the plurality of PDSCHs spanning one or more slots;
    transmitting a message to a user equipment (UE) indicating the SPS occasions; and
    transmitting data to the UE over the plurality of PDSCHs during the SPS occasions,
    wherein a number of PDSCHs of a given SPS occasion is increased or decreased in the time domain based on at least one of: traffic received at the UE, or an amount of data to be sent to the UE, and each of the plurality of PDSCHs in the given SPS occasion carries a variable number of data bits, and wherein a first SPS occasion of the SPS occasions includes a first PDSCH and a second PDSCH, and the first PDSCH and the second PDSCH use at least one of: different encoding schemes or different modulation schemes;
receiving an individual acknowledgment from the UE for a PDSCH in an SPS occasion; or
receiving a block acknowledgment from the UE for all PDSCH in the SPS occasion; or
receiving a joint acknowledgment from the UE for all PDSCH in multiple SPS occasions; wherein acknowledgments from the UE are referenced by one or more identifiers that map to one or more previously transmitted slots.

6. The method of claim 5, further comprising:
dynamically adjusting the number of the plurality of PDSCHs for an SPS occasion, wherein a different number of PDSCHs are used in two sequential SPS occasions.

7. The method of claim 6, further comprising:
sending a maximum number of PDSCHs allowed for the SPS occasions to the UE using a radio resource control (RRC) signaling, medium access control (MAC) signaling, or Layer1 signaling.

8. The method of claim 5, further comprising:
configuring one or more of the SPS occasions to include PDSCH retransmission information within a physical downlink control channel (PDCCH), the PDSCH retransmission information specifying one or more PDSCHs within the one or more of the SPS occasions.

9. The method of claim 5, further comprising:
transmitting a physical downlink control channel (PDCCH) separate from the SPS occasions, the PDCCH providing PDSCH retransmission information to the UE and specifying one or more of the SPS occasions in which PDSCHs are to be retransmitted.

10. The method of claim 5, wherein each of the one or more identifiers is a function of at least the periodicity and a maximum number of PDSCH in the given SPS occasion.

11. The method of claim 5, wherein the transmitting data to the UE over the plurality of PDSCHs during the SPS occasions includes:
using a different downlink beam to transmit each of the plurality of PDSCHs within an SPS occasion; or
using the different downlink beam to transmit the plurality of PDSCHs in different SPS occasions; or
using one downlink beam to transmit all PDSCHs within all the SPS occasions.

12. The method of claim 5, further comprising:
sending an indication to the UE specifying when one or more PDSCH within an SPS occasion are empty or will not be transmitted.

13. The method of claim 5, wherein the base station and the UE communicate using a 5G network.

14. A user equipment (UE), comprising:
a wireless transceiver; and
a processor coupled to the wireless transceiver, wherein the processor is configured to:
receive, from a base station, scheduling information indicating semi-persistent scheduling (SPS) occasions having a periodicity, each of the SPS occasions having a plurality of physical downlink shared channels (PDSCHs), each PDSCH of the plurality of PDSCHs spanning one or more slots;
adapt the wireless transceiver to receive according to the scheduling information; and
receive data over the plurality of PDSCHs during the SPS occasions,
wherein a number of PDSCHs of a given SPS occasion is increased or decreased in the time domain based on at least one of: traffic received at the UE, or an amount of data to be sent to the UE, and each of the plurality of PDSCHs in the given SPS occasion carries a variable number of data bits, and wherein a first SPS occasion of the SPS occasions includes a first PDSCH and a second PDSCH, and the first PDSCH and the second PDSCH use at least one of: different encoding schemes or different modulation schemes;
send acknowledgments, in response to received data over the plurality of PDSCHs, to indicate which of the plurality of PDSCHs were correctly or incorrectly received, the acknowledgments including one or more identifiers that map to one or more previously transmitted slots, and each of the one or more identifiers is a function of at least the periodicity and a maximum number of PDSCH in an SPS occasion.

15. The user equipment of claim 14, wherein the processor is configured to:
receive additional information from the base station that adjusts the number of the plurality of PDSCHs for an SPS occasion, wherein a different number of PDSCHs are used in two sequential SPS occasions.

16. The user equipment of claim 14, wherein the processor is further configured to:
receive one or more of the SPS occasions with PDSCH retransmission information within a physical downlink control channel (PDCCH), the PDSCH retransmission information specifying one or more PDSCHs within the one or more of the SPS occasions.

17. The user equipment of claim 14, wherein the processor is further configured to:
receive a physical downlink control channel (PDCCH) separate from the SPS occasions, the PDCCH providing PDSCH retransmission information to the UE and specifying one or more of the SPS occasions in which PDSCHs are to be retransmitted.

18. A method for communication at a user equipment (UE), comprising:
receiving, from a base station, scheduling information indicating semi-persistent scheduling (SPS) occasions having a periodicity, each of the SPS occasions having a plurality of physical downlink shared channels (PDSCHs), each PDSCH of the plurality of PDSCHs spanning one or more slots;
adapting a wireless transceiver to receive according to the scheduling information; and
receiving data over the plurality of PDSCHs during the SPS occasions,
wherein a number of PDSCHs of a given SPS occasion is increased or decreased in the time domain based on at least one of: traffic received at the UE, or an amount of data to be sent to the UE, and each of the plurality of PDSCHs in the given SPS occasion carries a variable number of data bits, and wherein a first SPS occasion of the SPS occasions includes a first PDSCH and a second PDSCH, and the first PDSCH and the second PDSCH use at least one of: different encoding schemes or different modulation schemes;
sending acknowledgments, in response to received data over the plurality of PDSCHs, indicating which of the plurality of PDSCHs were correctly or incorrectly received, the acknowledgments including one or more identifiers that map to one or more previously transmitted slots, and each of the one or more identifiers is a function of at least the periodicity and a maximum number of PDSCH in an SPS occasion.

19. The method of claim 18, further comprising:
receive additional information from the base station that adjusts the number of the plurality of PDSCHs for an SPS occasion, wherein a different number of PDSCHs are used in two sequential SPS occasions.

20. The method of claim 18, further comprising:
transmitting an individual acknowledgment to the base station for a PDSCH in an SPS occasion; or
transmitting a block acknowledgment to the base station for all PDSCH in the SPS occasion; or
transmitting a joint acknowledgment to the base station for all PDSCH in multiple SPS occasions.

21. The method of claim 18, further comprising:
receiving one or more of the SPS occasions with PDSCH retransmission information within a physical downlink control channel (PDCCH), the PDSCH retransmission information specifying one or more PDSCHs within the one or more of the SPS occasions.

22. The method of claim 18, further comprising:
receiving a physical downlink control channel (PDCCH) separate from the SPS occasions, the PDCCH providing PDSCH retransmission information to the UE and specifying one or more of the SPS occasions in which PDSCHs are to be retransmitted.

23. The method of claim 18, further comprising:
receiving an indication from the base station specifying when one or more PDSCH within an SPS occasion are empty or will not be transmitted, and
switching the UE to a power savings mode during time periods when the one or more PDSCH within the SPS occasion are indicated to be empty or will not be transmitted.

* * * * *